US006490451B1

United States Patent
Denman et al.

(10) Patent No.: US 6,490,451 B1
(45) Date of Patent: Dec. 3, 2002

(54) SYSTEM AND METHOD FOR PROVIDING PACKET-SWITCHED TELEPHONY

(75) Inventors: Robert E. Denman, Plano, TX (US); Don L. Jackson, Murphy, TX (US); Donald V. Hanley, McKinney, TX (US); Paul H. Boudreaux, Garland, TX (US); Stewart H. Maxwell, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/466,506

(22) Filed: Dec. 17, 1999

(51) Int. Cl.[7] .............................. H04Q 7/20; H04Q 7/22; H04Q 7/24
(52) U.S. Cl. ....................... 455/436; 455/436; 455/422; 455/466; 455/426; 455/445; 370/352; 370/353; 370/338; 370/401; 370/410; 370/465
(58) Field of Search ................................. 455/436, 432, 455/435, 422, 426, 437, 438, 439, 440, 441, 442, 445, 458, 466, 550, 517; 370/352, 353, 354, 355, 356, 338, 401, 410, 465

(56) References Cited

U.S. PATENT DOCUMENTS 6,072,778 A * 6/2000 Labedz et al. ............... 370/332
6,230,005 B1 * 5/2001 Le et al. ...................... 455/422

FOREIGN PATENT DOCUMENTS

WO    WO 99/16266    4/1999
WO    WO 99/33319    7/1999

OTHER PUBLICATIONS

R.R. Knight and B. Law; The Call Control Protocol in a Separated Call and Bearer Environment; BT Technol J. vol. 16, No. 2, pp. 75–86; Apr. 1, 1998.

Cheng, et al. Development of an Integrated Backbone Network for a High Capacity PCN Network; IEEE Globecom 1998; vol. 5, p. 3062–3067.

Vriendt, J. et al.; The UMTS Mobility Server: A Solution to Support Third Generation Mobility in ATM; pp. 251–262.

* cited by examiner

*Primary Examiner*—Lee Nguyen
*Assistant Examiner*—Keith Ferguson
(74) *Attorney, Agent, or Firm*—Paul W. Fulbright; Bracewell & Patterson, L.L.P.

(57) ABSTRACT

An improved method and system for providing packet-switched management of switching and handoff functions for a mobile terminal during call setup and user communication phases of a telecommunication session. A radio access network (RAN) including an air-interface base station in communication with the mobile terminal is in communicative contact with a packet-switched core network comprised of a plurality nodes which provide functionality that is equivalent to that of a network of Mobile Switching Centers (MSCs) and Visitor Location Registers (VLRs). A packet-switching backbone network provides communication transport facilities within the core network. Within the core network is a wireless access gateway (WAG) having media channels that provide an interface between the RAN and the core network. An Anchor Packet Gateway (APG) extends the bearer path from the WAG, and hides mobility between WAGs during the user communication phase. A wireless mobility server (WMS) in communicative contact with the WAG and APG serves as a media gateway controller for the WAG and APG, controlling connectivity of the media channels within the WAG and APG. A PSTN Trunking Media Gateway (PTMG) provides connectivity between the core network and the PSTN. A Call Server (CS) in communicative contact with the PTMG and WMS serves as a media gateway controller for the PTMG and WMS, where the WMS presents the appearance of a media gateway to the CS, but in fact functions as a media gateway controller for the WAG and APG. The CS and WMS together present the appearance of a single MSC/VLR to the public cellular or PCS network.

54 Claims, 22 Drawing Sheets

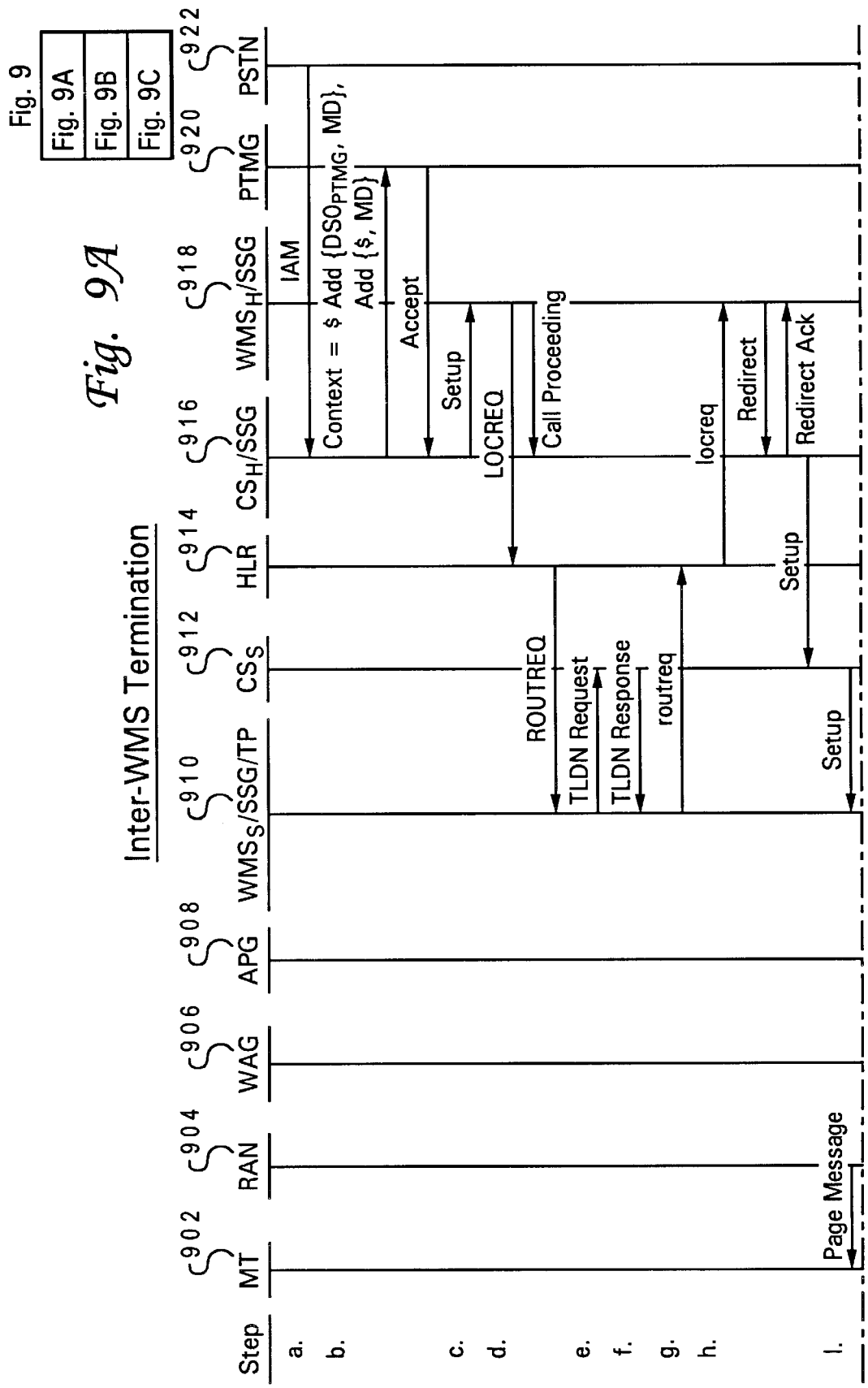

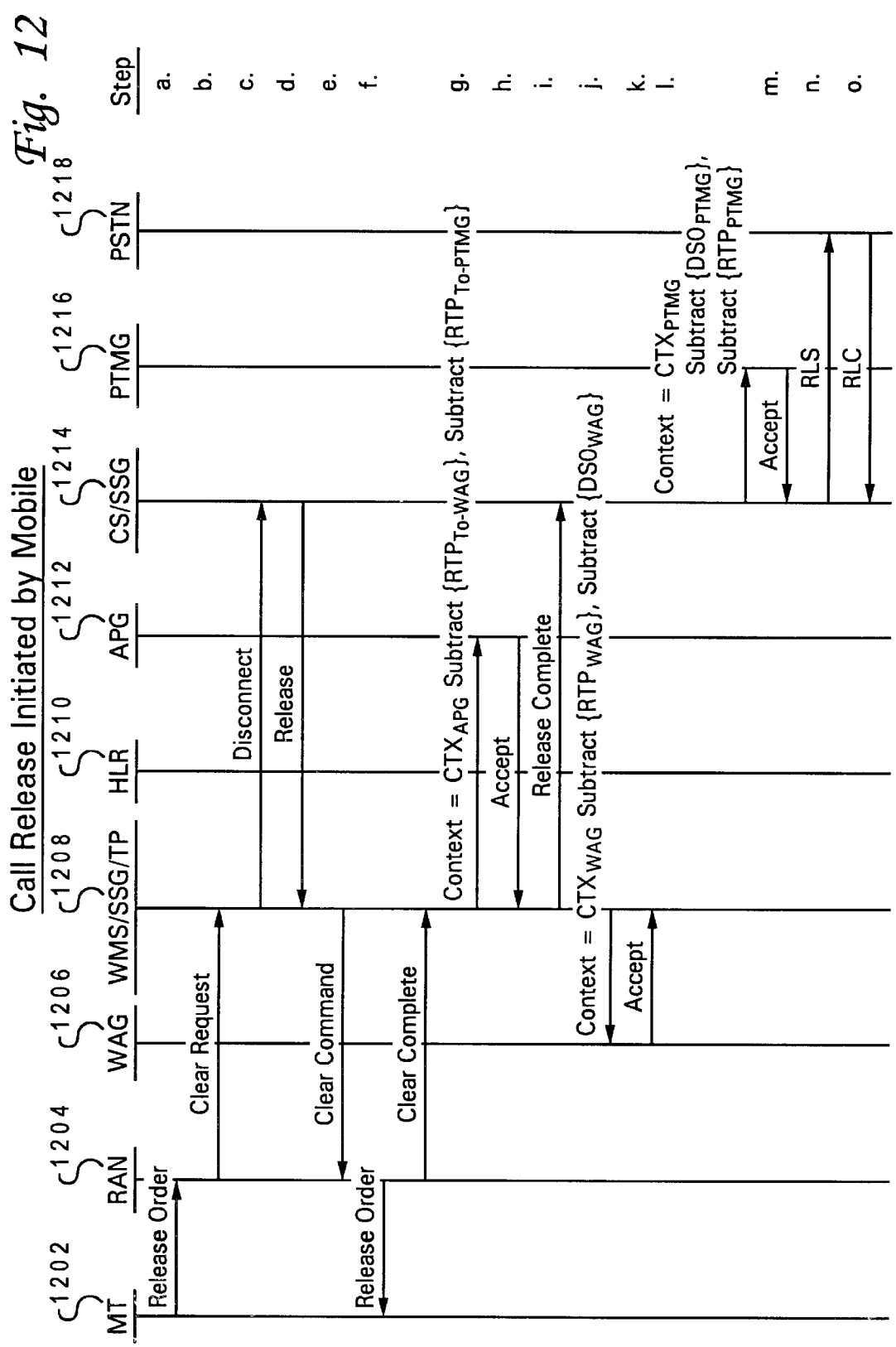

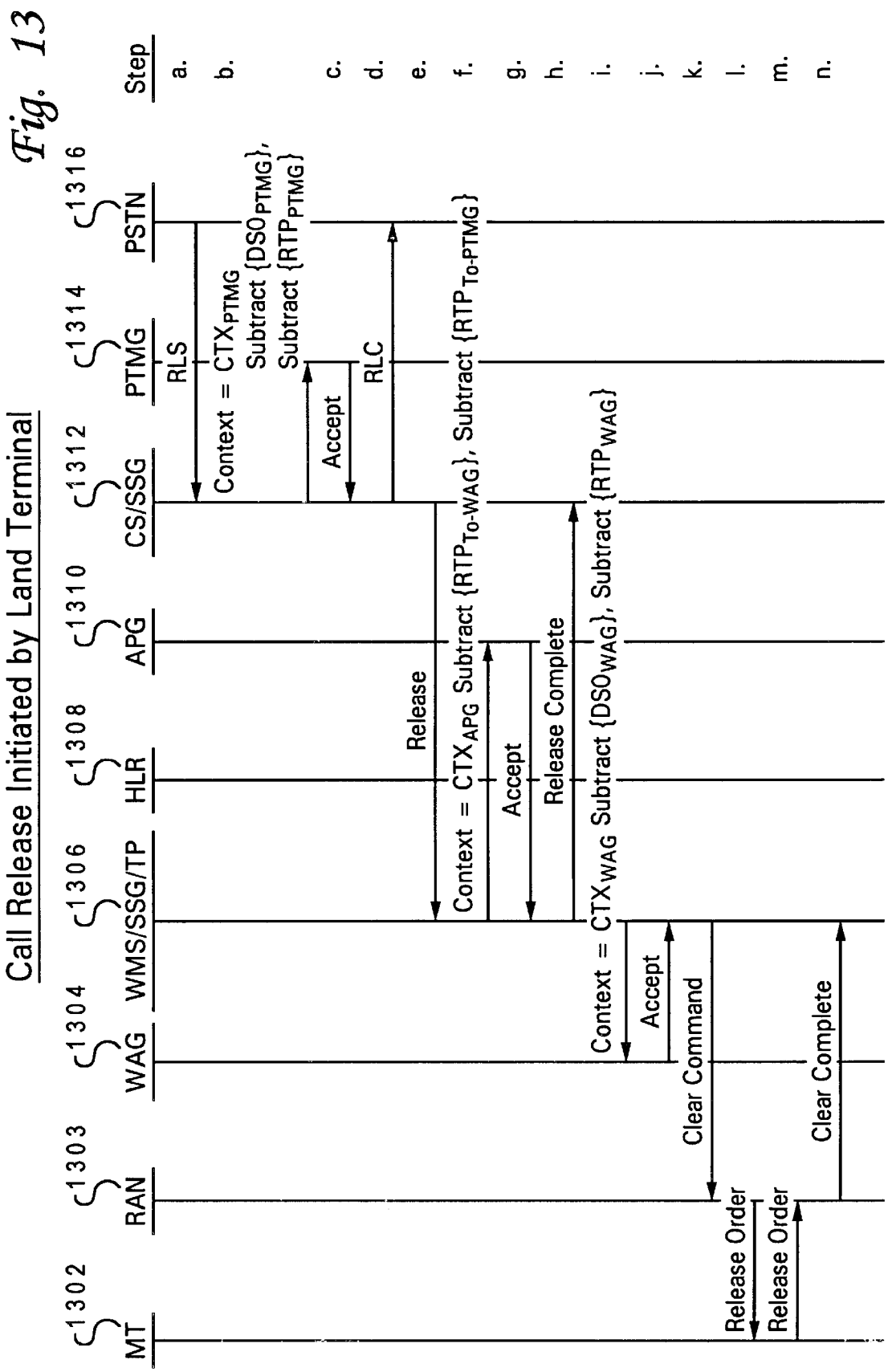

SYSTEM AND METHOD FOR PROVIDING PACKET-SWITCHED TELEPHONY

BACKGROUND OF THE INVENTION

1. Technical Field

The present invention relates in general to an improved telecommunications system, and in particular to a method and system for incorporating transport and control facilities for voice, multimedia, and data traffic into a distributed packet-switched core network. More particularly, the present invention relates to a managed, packet-switched core network including multiple nodes which together provide packet-switched management of call setup, mobility, and data transfer for a mobile terminal, thereby providing a packet-switched alternative to a network of circuit-switched Mobile Switching Center/Visitor Location Registers (MSC/VLRs).

2. Description of the Related Art

Utilization of wireless, mobile telephony systems has expanded dramatically in recent years. Such systems typically include cellular or Personal Communication System (PCS) networks. Within such networks, geographic areas are divided into "cells" served by low-power radio transmission facilities. A centralized computer and switching center, known as a Mobile Switching Center/Visitor Location Register (MSC/VLR), controls call setup between a mobile terminal (MT) and either another MT or a terminal linked directly to the Public Switched Telephone Network (PSTN), in addition to providing connectivity to other telecommunications networks.

FIG. 1 is a block diagram illustrative of an example MSC/VLR configuration within a conventional circuit-switched cellular telecommunications system 100. As shown in FIG. 1, telecommunications system 100 includes the network interconnection of a cellular subsystem 101 to a Public Switched Telephone Network (PSTN) 130 and a Public Data Network (PDN) 120. Cellular subsystem 101 is a Code Division Multiple Access (CDMA) wireless communications system in the depicted example. Also within cellular subsystem 101 are mobile terminals (MTs) 126 and 127 which may be handheld cellular phones or other mobile terminal user devices.

Cellular subsystem 101 further includes a Home Location Register (HLR) 104, and a pair or Mobile Switching Centers (MSCs) 102 and 103. Associated to MSCs 102 and 103, are a pair of Visitor Location Registers (VLRs), VLR 132 and VLR 133, respectively. HLR 104 is essentially a customer database within cellular subsystem 101 in which subscriber profile information for MTs, such as MT 126, is permanently stored. MSCs 102 and 103 are responsible for the switching of trunk circuits as well as the processing of call setup and mobility management signaling messages. In addition to operating as switches, MSC 102 and MSC 103 also function as telecommunications gateways to PDN 120 and PSTN 130 respectively.

MSCs 102 and 103 perform the necessary switching functions for any compatible MT located within a geographic area associated with a particular MSC, called a MSC serving area. Within cellular subsystem 101, MSC 103 provides call switching functionality between PSTN 130 and MTs 126 and 127. MSCs 102 and 103 also monitor the mobility of their respective served MTs and manage necessary resources needed to effect location registration procedures and carry out handoff functions. Although, in the depicted example, only two MSCs are illustrated in cellular subsystem 101, other numbers of MSCs may be employed depending on the communications system.

Each MT utilizes various radio frequency (RF) channels to communicate with a base station (BS). The RF channels utilized for control functions such as call setup during an origination attempt will be referred to hereinafter as control channels. In CDMA technology, the control channel consists of an access channel for control signaling from the MT, and a paging channel for control signaling to the MT. In contrast, RF channels utilized by MTs to convey voice or other end-user data are sometimes referred to as voice channels, and will be referred to hereinafter interchangeably as "traffic channels" (TCHs). TCHs may also be delineated according to the source of radio transmission. A Base Station (BS) 125 includes a base station transceiver subsystem (BSTS) 124 and a base station controller (BSC) 123. A TCH for transmitting from a BSTS is called the forward TCH, while a TCH utilized by the BSTS for receiving transmissions from the MT is called the reverse TCH.

HLR 104 is utilized within cellular subsystem 101 to manage mobile subscribers. Subscriber information that associates a serving MSC (MSC-S) with a particular MT is stored in permanent subscriber records within HLR 104. These records contain information such as the serving VLRs 132 and 133, and subscription parameters of MTs 126 and 127. For example, MT identity, Electronic Serial Number (ESN), and subscriber profile data are stored within HLR 104. VLRs 132 and 133 contain a copy of the records of the MTs currently residing within their respective service areas. In addition, VLRs 132 and 133 also keep track of the current location area of each MT in terms of the last accessed cell. This information is only temporarily stored at VLRs 132 and 133 and is removed once the subscribers move out of their respective service areas for a predetermined period of time. Most network equipment manufacturers have adopted a combined MSC/VLR approach such that each VLR is co-located with a MSC.

BS 125 includes the physical equipment for providing radio coverage to defined geographical RF-coverage areas called cells. BS 125 contains the hardware necessary to communicate with MT 126. BSC 123 performs control functions, while BSTS 124 performs the transmitting/receiving function within a given cell utilizing radio transmission/receiving equipment.

The PSTN and other networks include hierarchies of switches that are navigated to provide connections between telephones and other data terminal equipment (DTE). The primary function of a telephony switching system is to interconnect lines or trunks between telephones, DTEs, or other switches. In addition, switching facilities must perform other administrative functions besides switching such as control signaling, route selection, and toll call accounting. Conventional switches, including those incorporated into MSC/VLRs, incorporate some intelligent agent which provides management and control of switch functionality.

There are several problems associated with conventional circuit-switched MSC/VLR implementations such as that depicted in FIG. 1. Scalability of MSC/VLR networks is one such problem. When an MSC's port, switching, signaling, or processing capacity is exhausted, an entire MSC/VLR unit is often added as the finest increment for increasing network traffic handling capacity. Given this coarse granularity for scaling a carrier's networks, much of the per-switch dedicated peripheral equipment is underutilized (signaling links, announcement peripheral, conferencing peripheral, etc., for example).

As data traffic continues to increase relative to voice traffic, a conventional MSC/VLR network becomes a less efficient telecommunications management tool. Circuit-switched MSC/VLRs utilize dedicated two-way physical channels in which at least 50% of the allocated bandwidth generally conveys silence and is thus wasted for voice traffic. For data transmission, an even greater bandwidth is typically wasted due to the asymmetric and often bursty nature of data sessions (file transfers, for example). Consequently, carriers often overlay their voice networks with a data network, thereby incurring the costs of operating two networks. Recent developments in wideband wireless transmission have introduced the likelihood that wireless, mobile telecommunications will be increasingly utilized to support multimedia data sessions. Such data sessions will exacerbate current problems with circuit-switched telecommunications.

The nature of conventional MSC/VLR network implementations can result in bottlenecks such as HLR transaction capacity which often limits traffic handling capacity of such networks. As MSC/VLRs are added, mobility-related HLR messaging increases (especially registration signaling), thereby necessitating additional HLRs for such networks. One possible solution within the ANSI-41 network reference model for addressing an excessive HLR transaction load, is to serve multiple MSCs with a single VLR. In most implementations, however, the MSC's dependence on VLR data renders a decoupled MSC and VLR implementation unfeasible. Finally, a number of efforts have been made, without widespread success, to provide residential, business, and BRI line services to wireless, mobile subscribers.

It can therefore be appreciated that a need exists to address the limitations inherent in conventional circuit-switched MSC/VLR network implementations. Scalable, functional elements that operate in a packet-switched context may be utilized to efficiently accommodate both voice and data traffic, and thus alleviate the aforementioned problems with current MSC/VLR implementations.

SUMMARY OF THE INVENTION

It is therefore one object of the present invention to provide a method and system for replacing a circuit-switched network of MSC/VLRs with a packet-switched core network.

It is another object of the present invention to provide a physically decomposed, packet-switched core network for incorporating the voice and data traffic transport and control facilities conventionally provided by networked MSC/VLRs.

The above and other objects are achieved as is now described. An improved method and system are disclosed for providing packet-switched management of switching and handoff functions for a mobile terminal during call setup and user communication phases of a telecommunication session. A radio access network (RAN) including an air-interface transceiver in communication with the mobile terminal is in communicative contact with a packet-switched core network including a plurality of heterogeneous functional nodes. These heterogeneous, scalable nodes in such a core network together provide the functionality that is attributed to multiple MSC/VLRs in a circuit-switched context. Within the core network are wireless access gateways (WAGs) having media channels that provide an interface between the radio access network and the core network. A wireless mobility server (WMS) in communicative contact with the WAGs and anchor packet gateways (APGs), serves as a media gateway controller (MGC) for each WAG and each APG, controlling connectivity of the media channels therein. The WMS also presents the appearance of a single MSC/VLR to the ANSI-41 signaling network, on behalf of other network elements that together provide the functionality of a network of MSC/VLRs. The WMS and APG together hide the mobility and wireless characteristics of the MT on the control and bearer planes respectively. A call server (CS) serves as an MGC for trunking media gateways, and its functionality may be derived from an MSC or Class 5 End Office, depending on the service set to be provided to mobile terminals. A packet-switching network serves as the core network backbone providing packet-switched communication transport facilities between nodes.

BRIEF DESCRIPTION OF THE DRAWINGS

The novel features that characterize this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 12 is a simplified message sequence depicting a call release initiated by a mobile terminal in accordance with the method and system of the present invention; and FIG. 13 is a simplified message sequence illustrating a call release initiated by a terminal within a PSTN in accordance with the method and system of the present invention.

DETAILED DESCRIPTION OF PREFERRED EMBODIMENT

Figure 1:
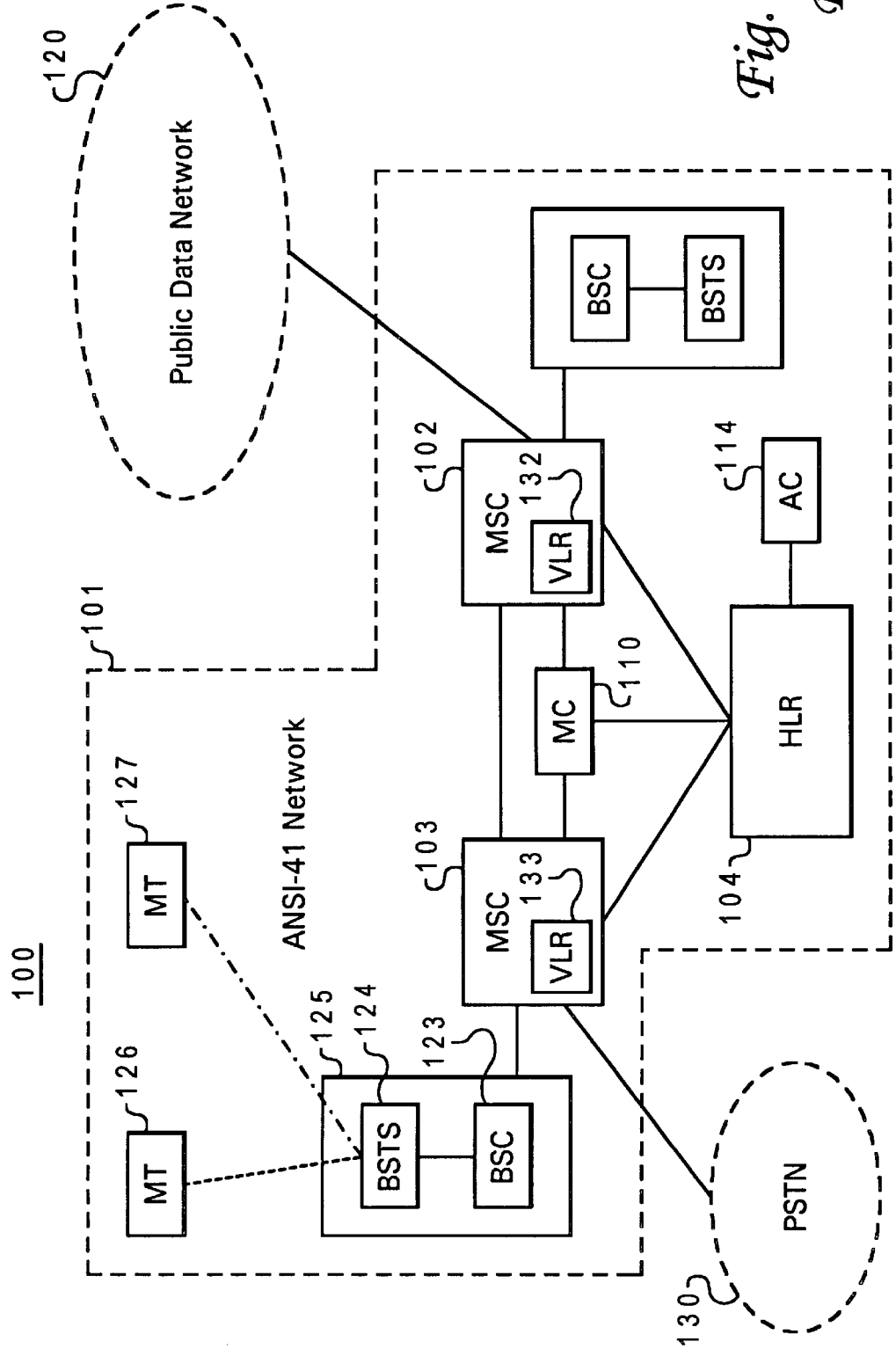
FIG. 1 illustrates high-level logical relationships served by conventional MSC/VLRs within circuit-switched wireless telephony infrastructures.

The system and method of the present invention provide a managed, packet-switching network that serves a role traditionally provided in a network of MSC/VLRs within a conventional circuit-switched telecommunications network. The core network includes various nodes, which together provide the functionality of a system of conventional circuit-switched MSC/VLRs. Included among the objectives of such a packet-switched core network are the following: increased network capacity; improved network scalability; reduced cost of network provisioning and operations; provisioning resources on a per-network (versus per-switch) basis; a reduced transaction load on HLRs; enablement of providing line services to mobile terminals (MTs); and an evolution toward non-circuit-switched, distributed networks capable of seamlessly transmitting voice, data, and multimedia traffic to and from mobile telecommunications terminals. Such a packet-switched (versus circuit-switched) implementation will afford the following transport economics: shortest path routing (versus backhaul to a switch); silence suppression; compressed voice; common transport network for voice, data, and multimedia.

As one of several approaches to data transport over telecommunications networks, packet-switching systems are utilized to transmit data in relatively small segments (a few up to hundreds of bytes) over digital telecommunications facilities. As utilized herein, "packet-switching" refers to data delivery over a telecommunications network in which information is first partitioned into smaller segments, frames, cells, etc., and then relayed through stations in the network along the best available path. In this manner each packet may travel along a different path, and the packets comprising a message may arrive out of sequence at the destination node. The destination node will then reassemble and verify the original message. Transmission facilities within a packet-switched network are shared by multiple calls and data sessions, and network bandwidth is consumed only when data requires transmission. In contrast, a conventional circuit-switched telephony system "nails up" bandwidth for the duration of the call session, regardless of whether any data actually requires transmission. Included among such packet-switched networks are those based on Asynchronous Transfer Mode (ATM) and Internet Protocol (IP) protocol, and Multi-Protocol Label Switching (MPLS).

ATM is a protocol-independent, cell switching data transfer system utilized to support data, voice, and video traffic. A key feature of ATM transmission is that it offers high speed and low latency support for data transmission. ATM also lends itself to upward and downward scaling, making it equally well suited to supporting multimedia applications. ATM serves a broad range of applications very efficiently by allowing an appropriate Quality of Service (QoS) to be specified for different applications. Several categories have been developed to help characterize network traffic, each of which has its own QoS requirements. One such category is known as Constant Bit Rate (CBR). CBR provides a fixed circuit for traffic applications that require a steady supply of bandwidth, such as voice, video and multimedia. The Variable Bit Rate (VBR) is another connection-oriented category of ATM data transfer which provides synchronous transmission suitable for voice and bursty video traffic.

Other packet-switched networks are based on the Internet Protocol (IP) suite of protocols. These protocols govern the partitioning of data messages into packets, the routing of the packets from the source to the destination station, and the re-assembly of the packets upon receipt by the destination station.

Figure 2:
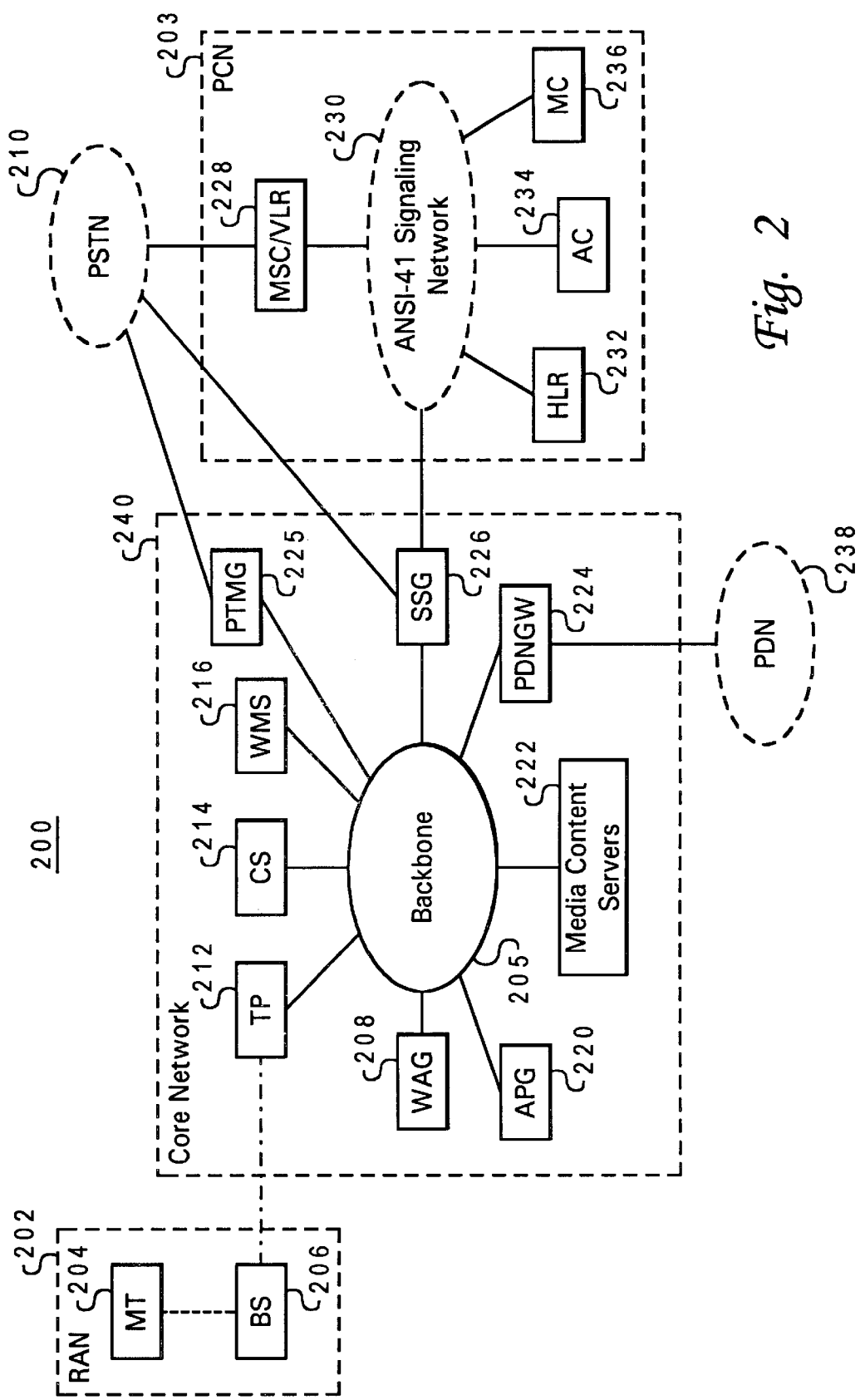
FIG. 2 is a block diagram depicting functional elements of a core network in accordance with the teachings of the present invention.

FIG. 2 illustrates a simplified block diagram of functional elements of a telecommunications system 200 in accordance with the teachings of the present invention. Telecommunications system 200 includes a Public Cellular Network (PCN) 203, a Core Network (CN) 240, a Radio Access Network (RAN) 202, a Public Switched Telephone Network (PSTN) 210, and a Public Data Network (PDN) 238. The bolded boxes within CN 240 show nodes related to the packet-switched telephony system implemented by the teachings of the present invention.

Included within RAN 202 is a Mobile Terminal (MT) 204 and a Base Station (BS) 206. Consistent with the teachings of the present invention, RAN 202 may employ Time Division Multiple Access (TDMA), Code Division Multiple Access (CDMA), or analog RF technology. BS 206 may include a CDMA Base Station Controller (BSC) and a Base Transceiver Station (BSTS), for example.

A managed backbone 205 within CN 240 may be ATM- and/or IP-based, and is utilized to provide packet-switched transport of signaling and bearer data among the nodes within CN 240. On the bearer plane, the backbone network effectively replaces the MSC switching fabrics and inter-MSC trunks of a conventional network of MSCs. On the control plane (referred to alternately as the "signaling plane"), the backbone network replaces signaling transport for the inter-MSC, Signaling System 7 (SS7) signaling of conventional MSC networks. An SS7 Signaling Gateway (SSG) 226 supplies CN 240 with connectivity to SS7 networks, for both ANSI-41 TCAP transactions, and out-of-band call-control signaling (ISUP or CTUP for example). An SS7 network to which SSG 226 connects is typically a separate, circuit-switched network that provides call control and transaction signaling between intelligent network nodes such as CS 214 or WMS 216 within CN 240, and MSC/VLR 228 and HLR 232 within PCN 203.

Also providing connectivity between CN 240 and outside networks are Public Data Network Gateway (PDNGW) 224 and PSTN Trunking Media Gateway (PTMG) 225. PDNGW 224 routes packets between CN 240 and PDN 238, and in doing so, provides a firewall between PDN 238 and CN 240. PTMG 225 provides Media Gateway (MG) functionality, supplying bearer-path connectivity and interworking between PSTN trunks (DSOs for example) and CN 240, with optional transcoding. PTMG 225, under the direction of a CS 214, may also supply per-trunk signaling (PTS), such as R1, C1, and R2.

A Wireless Access Gateway (WAG) 208 provides MG functionality, supplying bearer-path connectivity and interworking between RAN 202 and CN 240, and may optionally provide transcoding. A single WAG, such as WAG 208 may serve more than one BS. WAG 208 may be implemented as part of RAN 202, such that RAN 202 may provide data packets directly to CN 240.

An Anchor Packet Gateway (APG) 220 hides details relevant to the mobility of MT 204 on the bearer plane from PTMG 225 and other nodes (Media Content Servers 222, PDNGW 224, etc.). Such details include those related to a mobile handoff (from one WAG to another or from a WAG to a MSC/VLR 228 within PCN 203). APG 220 also provides bearer-path connectivity between a serving WAG, such as WAG 208, and other gateways (PTMG 225, PDNGW 224) or Media Content Servers 222, for example. APG 220 must provide multicast capability, in order to support conveyance of bearer data to two WAGs involved in an inter-WAG handoff (See FIG. 10 for a further explanation of inter-WAG handoff in accordance with the present invention). APG 220, depicted as a separate entity within CN 240, may alternatively be collocated with either WAG 208 or PTMG 225.

A Wireless Mobility Server (WMS) 216 presents the appearance of a single MSC/VLR to the ANSI-41 Signaling Network 230 within PCN 203. WMS 216 hides from a Call Server (CS) 214 the fact that one or more of the terminals in a call are wireless and mobile, thereby enabling utilization of an other-than-MSC-derived CS. The functionality of WMS 216 includes that related to MT access, MT-specific services, MT authorization, and authentication, ANSI-41 message and parameter encoding/decoding, the VLR, and mobility management. Among the mobility management functions of WMS 216 are registrations, call delivery, paging, handoff, etc. Authorization-related WMS functionality includes screening checks for an unregistered mobile (UMOB), detecting mismatches between a mobile terminal's electronic serial number (ESN) and either Mobile Identification Number (MIN) or International Mobile Subscriber Identifier (IMSI), and performing control channel (CCH) received signal strength indicator (RSSI) screening (for non-CDMA MTs). WMS 216 also performs emergency translations, since the called number will vary according to the mobile's location. In general, WMS functions as a Media Gateway Controller (MGC) for WAG 208 and an Anchor Packet Gateway (APG) 220, and presents the appearance of a Media Gateway (MG) to CS 214.

Operating in support of WMS 216 is Terminal Proxy (TP) 212 which effectively hides the RF technology-specific operational details of RAN 202 from WMS 216. By presenting a normalized signaling interface to WMS 216, TP 212 hides specific RF technology and implementation from WMS 216. TP 212 also conveys signaling data between RAN 202 and WMS 216. TP 212, depicted within CN 240 as a separate entity, may alternatively be collocated with either WAG 208, BS 206, or WMS 216. A single TP, such as TP 212 may serve more than one BS.

A Call Server (CS) 214 functions as an MGC for PTMG 225 and WMS 216, and provides wireless- and mobility-independent services, such as call waiting and three-way-call. CS 214 also provides "basic call" functions, such as translations and routing. It should be noted the CS 214 may be derived from an MSC or a Local Exchange (LE), depending on the service set to be offered to mobile subscribers. It is noteworthy that, on the control/signaling plane, WMS 216 and CS 214 together present the appearance of an MSC/VLR to a Public Cellular Network (PCN) 203. While the VLR functionality is entirely provided by WMS 216, MSC functionality is split between WMS 216 and CS 214. WMS 216 presents an MSC interface to the ANSI-41 interface 230 via SSG 226. CS 214 presents MSC-related, SS7 call-control signaling (e.g., ISUP) via SSG 226 and PSTN 210. Media Content Servers 222 include both announcement servers, conferencing servers, and tone generation servers. Such servers may be standalone and/or collocated with WAG 208 and PTMG 225.

Billing-related information is collected by a subset of network nodes within CN 240 and is correlated by use of a billing identification code that is passed by inter-nodal messaging. Billing services (correlating billing information related to a call or data session, and creating a detailed call record, for example) may be provided by a separate billing server, or may be collocated with some other network element.

It should be noted that telecommunications system 200 depicts the functional architecture of one embodiment of the present invention, and not necessarily the actual physical implementation. For purposes of scalability, reliability, survivability, and to minimize backhaul of bearer and signaling data across the packet-switched network, an embodiment of the present invention includes multiple replications of any node as may be necessary to improve efficiency and overall performance. Functional elements of the invention may be combined in various ways, possibly utilizing existing network elements, without departing from the spirit or scope of the present invention. For example, a single hardware platform may host more than one functional element. Conversely, implementation of a functional element may employ multiple hardware platforms. One possible embodiment of the present invention may require decomposing one or more functional elements into separate sub-elements. For example, the MGC functionality of WMS 216 and/or CS 214 may be implemented on a separate platform than other functionality allocated to WMS 216 or CS 214.

Figure 3:
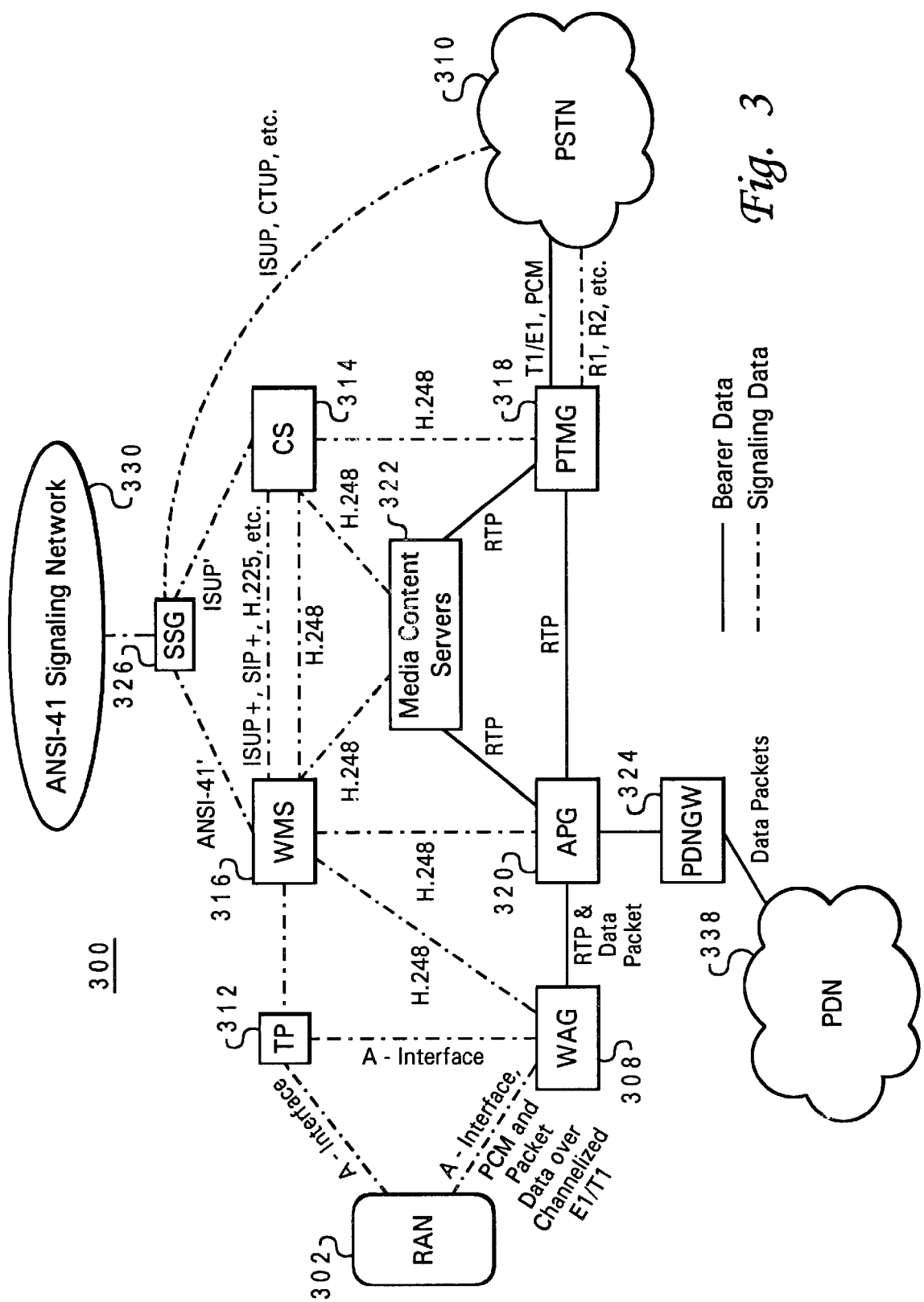
FIG. 3 is a simplified schematic representation of a telecommunication network illustrating the application-layer communication interfaces within a core network.

FIG. 3: Interfaces in Reference Model of Core Network

A telecommunications network 300 represented in FIG. 3 provides a schematic representation of the application-layer communication interfaces utilized by the packet-switched core network of the present invention. It should be noted that the schematic diagram of FIG. 3 is simplified, leaving many underlying transport mechanisms unrepresented. One skilled in the art will appreciate and understand the extensions necessary for functional completeness of the diagram illustrated in FIG. 3. The purpose of the diagram in FIG. 3 is to illustrate and identify an exemplary set of protocols exchanged between functional elements of a packet-switched core network in accordance with the teachings of the present invention. The core network depicted in FIG. 3 is assumed to be IP-based, with Domain Name Server (DNS) interactions not shown to simplify the diagram. (As an alternative to DNS, functional elements may retain the IP address of other elements with which they communicate). An ATM-based network could also be utilized, with messaging over an ATM user-to-network interface (UNI) that establishes switched virtual circuits (SVCS) and/or permanent virtual circuits (PVCs). Alternatively, an IP-on-ATM network could be utilized. The method and system of the present invention are thus applicable utilizing any packet-switching implementation.

As shown in FIG. 3, telecommunication network 300 has signaling interfaces to several external networks including an ANSI-41 signaling network 330, a PSTN 310 and a RAN 302. Each of these is in communication with a core network of functional nodes which collectively manage call setup, mobility, and data transfer functions for a MT within RAN 302. PSTN 310 exchanges call-control signals with a PSTN Trunking Media Gateway (PTMG) 318 utilizing per trunk signaling (R1, R2, C1, etc.). A portion of the SS7 protocol stack within ANSI-41 protocol may be utilized for control signal exchanges between ANSI-41 Signaling Network 330 and SS7 Signaling Gateway (SSG) 326. The remainder of the SS7 protocol stack is utilized to convey call-control signaling between SSG 326 and PSTN 310 (ISUP, CTUP, etc.).

RAN 302 and a Terminal Proxy (TP) 312 exchange call-control messages utilizing EIA/TIA/IS-634 A1 A-interface or a proprietary interface. This control signal interface may be a direct interface between TP 312 and RAN 302, or an indirect interface. In the latter case, TP 312 exchanges asynchronous A-Interface data with a Wireless Access Gateway (WAG) 308 which exchanges such signaling with RAN 302 utilizing one or more dedicated DSO channels of a T1/E1 trunk which is otherwise utilized for voice traffic.

The core network exemplified in FIG. 3 includes a plurality of packet-switched nodes including: SSG 326, a Wireless Mobility Server (WMS) 316, a Call Server (CS) 314, media content servers 322, PTMG 318, an Anchor Packet Gateway (APG) 320, a PDN Gateway (PDNGW) 324, TP 312, and WAG 308. Consistent with the spirit and scope of the present invention, the control signaling interfaces between these functional entities may be proprietary or may be open, standardized interfaces. FIG. 3 illustrates viable open interfaces, thus providing an exemplary reference readily understood by one skilled in the art. WMS 316 and SSG 326 share an ANSI-41-based protocol. CS 314 and SSG 326 utilize an ISUP-based protocol. A media gateway control protocol, such as MEGACOP (also known as H.248) or H.245, is utilized to exchange signaling messages during interactions in which WMS 316 and CS 314 act as media gateway and media gateway controller, respectively. When CS 314 and WMS 316 are engaged in call control, ISUP+, SIP+, H.225, or some Q.931-based protocol is utilized for call-control signaling. With extensions, MEGACOP could also be utilized for such signaling. Inter-CS signaling also employs one of the above-mentioned options for call-control signaling.

WMS 316 and CS 314 also utilize a media gateway protocol, such as MEGACOP (H.248), for control message exchanges with media content servers 322. A media gateway control protocol is also employed for control signaling exchanges between WMS 316 and APG 320, WMS 316 and WAG 308, and CS 314 and PTMG 318. ANSI-41 protocol or, an ANSI-41-derived protocol, is utilized for inter-WMS control signaling over either the SS7 network via SSG 326, or the core network. WMS 316 and TP 312 utilize an A-interface-derived protocol, which normalizes, to the greatest extent possible, differences between RF technologies.

FIG. 3 also illustrates bearer data paths and protocols which may be implemented within the core network of the present invention. The mode of data transport utilized to convey bearer-path information to and from external interfaces is as follows. T1- or E1-trunk borne Pulse Coded Modulated (PCM) voice samples convey bearer data between WAG 308 and RAN 302. Data packets (as opposed to PCM samples) to or from the MT are also conveyed over DSO media channels between RAN 302 and WAG 308, but the packet are sent through an IP tunnel that terminates at APG 320. Bearer-path data is exchanged as data packets between PDNGW 324 and PDN 338 from data ultimately exchanged end-to-end between PDN 338 and a MT within RAN 302. PCM over a T1 or E1 trunk channel is utilized between PTMG 318 and PSTN 310.

Within an IP-based core network, bearer data interfaces generally employ the Real-time Transport Protocol (RTP) for voice and other delay-sensitive data. An ATM-based core network employs AAL1/AAL2 for voice traffic (or data that is circuit-switched within PSTN 310). Other traffic may be exchanged between APG 320 and PDNGW 324 in data packets over either AAL5 for an ATM network, or TCP or UDP for an IP core network. The Real-time Transport Protocol may be utilized in conjunction with streamed data (announcements from media content servers 322, for example).

Figure 4:
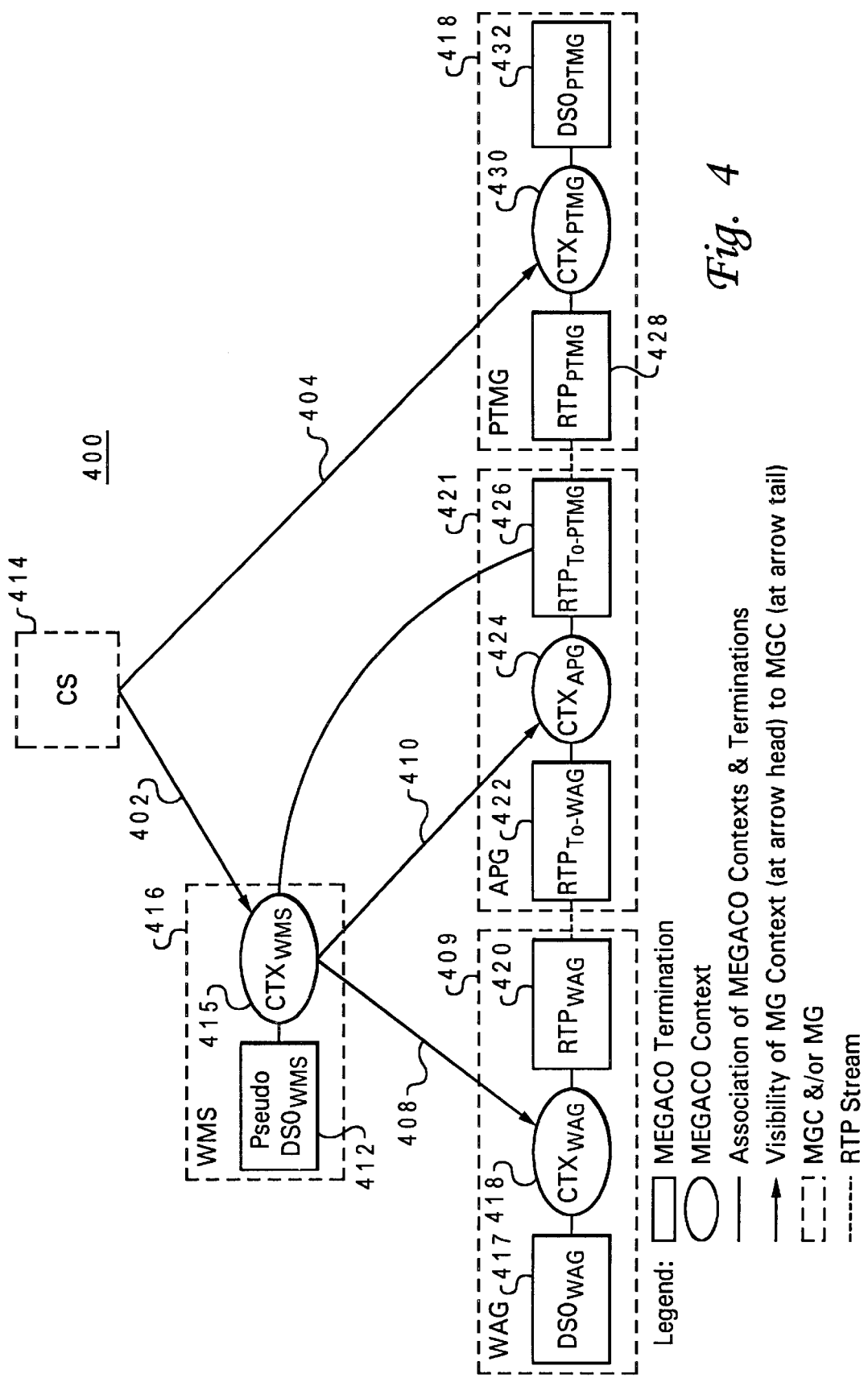
FIG. 4 is a block diagram depicting creation and utilization of media gateway control protocol terminations and contexts by a packet-switched core network in accordance with the method and system of the present invention.

FIG. 4 is a block diagram depicting creation and utilization of media gateway control protocol terminations and contexts by a packet-switched core network in accordance with the method and system of the present invention. While the depicted diagram of FIG. 4 assumes utilization of H.248, it will be appreciated and understood by those skilled in the art that various other media control protocols may be used without departing from the spirit or scope of the present invention. FIG. 4 assumes a land-to-mobile (L2M) or mobile-to-land (M2L) call. A Wireless Mobility Server (WMS) 416 functions as a media gateway proxy with respect to a Call Server (CS) 414 which maintains visibility to context $CTX_{WMS}$ 415 as illustrated by arrow 402. CS 414 also has visibility to a termination, $RTP_{TO-PTMG}$ 426, and a pseudo termination, $DSO_{WMS}$ 412, both within $CTX_{WMS}$ 415. CS 414 also serves as the MGC for PTMG 418, and therefore has visibility to context $CTX_{PTMG}$ 430 as well as its associated terminations $RTP_{PTMG}$ 428 and $DSO_{PTMG}$ 432 as shown by arrow 404.

While WMS 416 presents the appearance of a trunk media gateway with respect to CS 414 (over a media gateway control interface), it actually performs media gateway control tasks both for a Wireless Access Gateway (WAG) 409, and an Anchor Packet Gateway (APG) 421. WMS 416 has visibility to media channels (characterized as H.248 contexts and terminations in the present example) within both WAG 409 and APG 421, as shown by arrows 408 and 410 respectively. Pseudo DSO termination $DSO_{WMS}$ 412 has been established by WMS 416 within context $CTX_{WMS}$ 415 in response to a request from CS 414.

In an important feature of the present invention, WMS 416 represents pseudo termination $DSO_{WMS}$ 412 to CS 414 as a physical termination corresponding to a DSO of an E1 or T1 trunk which, in fact, does not actually exist. Pseudo-DSO termination $DSO_{WMS}$ 412 thus conceals the mobility-related characteristics of the MT from CS 414. (FIG. 4 assumes that CS 414 is MSC-derived, and that CS 414 views WMS 416 as a trunking MG. An end-office-derived CS may interact with WMS 416 as if WMS 416 is a line MG, in order to offer residential, business, or BRI line services to mobile, wireless terminals.)

In addition to allocating $CTX_{WMS}$ 415 and pseudo-DSO termination ID $DSO_{WMS}$ 412, WMS 416 has delivered a MEGACO transaction to WAG 409 which terminates the actual, selected DSO, thereby creating context $CTX_{WAG}$ 418 for two necessary traffic path terminations within WAG 409. One of these terminations, $DSO_{WAG}$ 417, designates the selected DSO; and the other, $RTP_{WAG}$ 420, designates the RTP stream to be established between WAG 409 and APG 421. Pseudo $DSO_{WMS}$ 412 logically corresponds to physical $DSO_{WAG}$ 417, where the latter may change during the course of the call due to handoff. The number of provisioned pseudo DSOs should equal the number of physical DSO ports on WAGs that are managed by WMS 416. These pseudo DSOs must be provisioned on both WMS 416 as well as CS 414. All pseudo DSOs associated with WMS 416 may be provided in the same trunk group, to which CS 414 routes calls to MTs.

In response to another WMS-416 initiated MEGACO transaction, APG 421 generates a context, $CTX_{APG}$ 424, having bearer-path terminations $RTP_{TO-WAG}$ 422 and $RTP_{TO-PTMG}$ 426. It should be noted that while $RTP_{TO-PTMG}$ 426 is actually part of context $CTX_{APG}$ 424, WMS 416 presents the appearance to CS 414 that $RTP_{TO-PTMG}$ 426 is within context $CTX_{WMS}$ 415. Besides maintaining mappings between contexts and terminations for contexts within WMS 416, WAG 409, and APG 421, WMS 416 also provides a mapping between contexts $CTX_{WMS}$ 415 and $CTX_{WAG}$ 418 and between contexts $CTX_{WMS}$ 415 and $CTX_{APG}$ 424. For a mobile-to-mobile (M2M) call scenario, APG 421 establishes a single context with two terminations, one for the originating MT (RTP$_{MT-O}$) and the other for the terminating MT (RTP$_{MT-T}$).

FIGS. 5 through 13 depict nine scenarios in which a packet-switched core network (CN) manages call setup, mobility, and data transfer for a MT in accordance with the method and system of the present invention. The message sequences within these scenario figures illustrate the manner in which the packet-switched architecture depicted in FIGS. 2, 3, and 4 distributes the functionality formerly found within a conventional network of circuit-switched MSC/VLRs. An explicit recital of MSC/VLR functionality allocation is not provided herein, however, sufficient operational detail is provided such that one with ordinary skill in the art may infer allocation of functionality that is not specifically described.

Among the assumptions made in the message diagrams of FIGS. 5 through 13 is that the AC has not shared authentication-related Shared Secret Data (SSD) with the MSC/VLR. It is also assumed that the bearer-path between the RAN and the WAG is provided via a channelized T1 or E1 trunk. An IP-based CN is further assumed, with Domain Name Server (DNS) interactions not depicted to simplify the diagrams. Alternatively, it could be assumed that the CN components already "know" the IP addresses of other components to which they interface. Such component nodes within the CN would include those identified within CN 240 of FIG. 2.

It is further assumed with respect to each of the following figures, that the TP is collocated with the WMS, and that SSG functionality is collocated with both the WMS and CS. While the CN of the present invention is capable of interfacing with RANs of various RF technologies (IS-136, analog, etc.), the messaging diagrams of the following figures assume an IS-95 RAN.

Regarding bearer-path data (voice or data traffic) representation, it is assumed in FIGS. 5 through 13 that the RAN presents G.711 Pulse Coded Modulation (PCM) voice data to the WAG, which is conveyed across the CN without transcoding, to the PTMG, which also exchanges PCM with the PSTN. Transcoding therefore occurs at the RAN, between G.711 and QSELP or EVRC. Alternatively, transcoding could occur at the APG or at the PTMG, such that QSELP/EVRC data transits the CN. (For Mobile-to-Mobile calls, transcoding could be omitted altogether). Call-control messages exchanged between the CS and the WMS are assumed to be Q.931 derived. It is further assumed that the transport-layer protocol utilized for such messaging is unreliable; thus, application-layer acknowledgment of messages is often required.

It should be noted that the inventive embodiments illustrated in FIGS. 5 through 13 are illustrative examples and do not limit the scope of the present invention to a particular signaling technology or protocol. Among the protocols utilized in relation to the following figures are ANSI-41, ISUP, IS-95, IS-634, and a proposed Media Gateway Control Protocol (MEGACOP) defined in Internet Engineering Task Force (IETF) Recommendation H.248. MEGACOP defines a suite of protocols to be utilized between elements of a physically decomposed multimedia gateway. For an in-depth explanation of MEGACOP see reference (MEGACO/H.23).

Simplified abstractions of several MEGACOP messages and commands are included for illustrative purposes within FIGS. 5 through 13. Included within the following figures are references to functional abstractions referred to hereinafter as "Terminations" and "Contexts," defined within MEGACO as follows. A termination is a logical entity capable of sourcing or sinking one or more media. In the context of a multimedia conference for example, a Termination may be a multimedia source or sink for multiple media streams. The Termination would encapsulate the media stream, modem, and bearer parameters (See MEGACOP/H.248). A Context is defined as an association among a collection of Terminations that include a single telecommunications session. Such a session may be a point-to-point call or a multipoint conference of a single medium type (voice traffic, for example) or multiple media types (voice, audio, and data, for example). A Context describes the communicative topology, and media mixing and switching parameters involved in a telecommunications session.

Initial MT Registration

Figure 5:
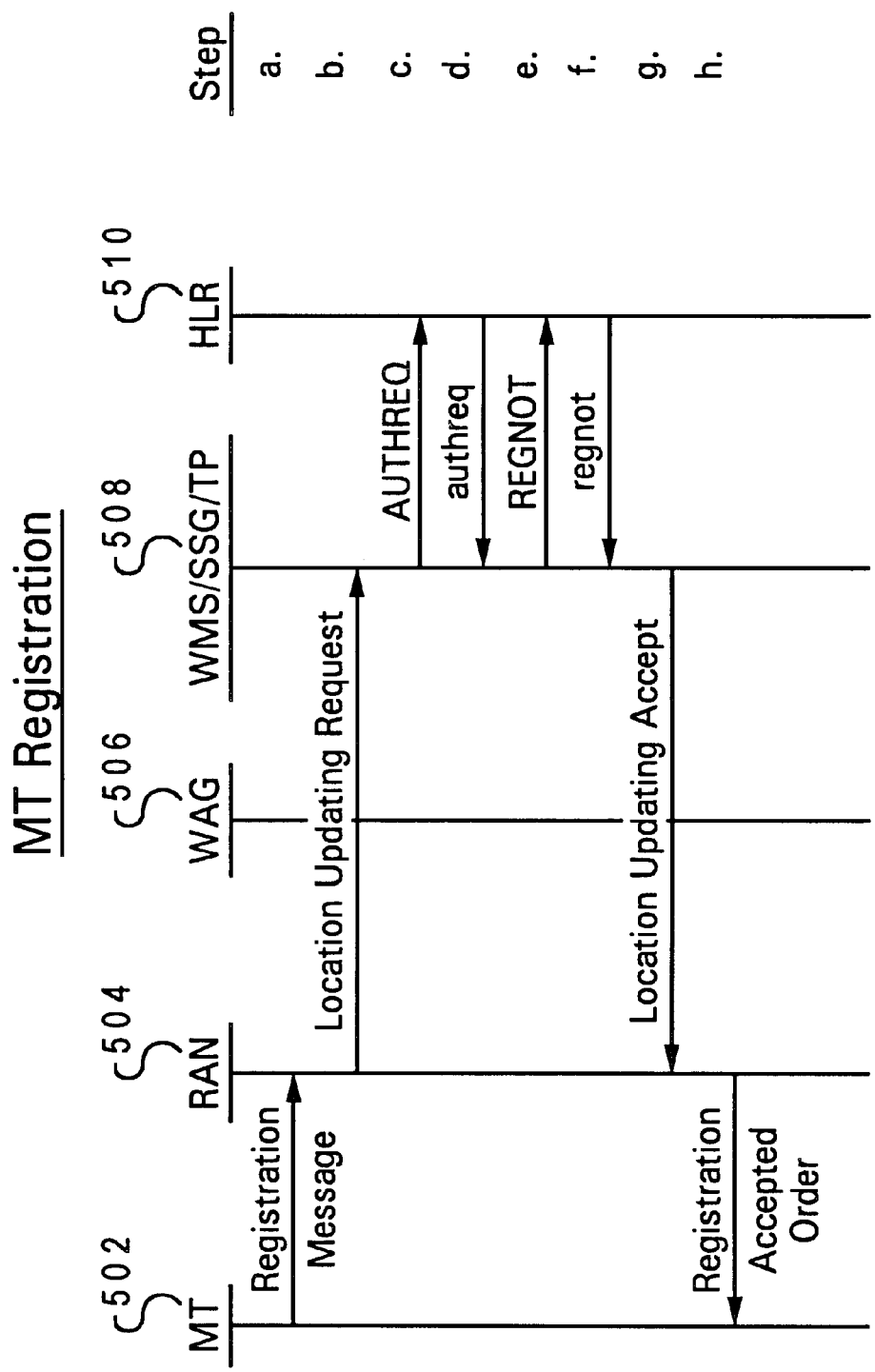
FIG. 5 is a simplified message sequence illustrating initial registration by a mobile terminal (MT) in accordance with the method and system of the present invention.

Turning now to the first of the telecommunications scenario figures, FIG. 5 illustrates a simplified sequence of messages exchanged within a core network, such as CN 240, during initial registration by a MT 502 (assumed to be a mobile voice terminal). Prior to the MT registration, nodes within the CN have knowledge of neither the location and status of MT 502, nor the contents of its HLR-specific profile. Initial registration typically occurs when MT 502 "powers-on," or when an active, roaming MT moves into the geographic area served by the CN. Thereafter, MT 502 autonomously initiates its registration as previously directed by the Radio Access Network (RAN) 504 (periodically, or when MT 502 moves into a new cell, for example). Permitted registration types are constrained by access configuration parameters transmitted by RAN 504 on the paging channel of the visited cell. Included among these parameters are an indication of whether system accesses should be authenticated and, if so, a Random Variable (RAND) value utilized by the authentication algorithm. Prior to the start of the registration scenario, it is assumed that a Wireless Mobility Server (WMS) 508 has already conveyed access configuration requirements/parameters to RAN 504, which determines the parameters passed to MT 502.

Together, WAG 506 and WMS/SSG/TP 508 include the core network depicted in FIG. 5. All messages exchanged between MT 502 and RAN 504 during the MT registration are IS-95 messages utilized within a CDMA RF technology context. It should be noted that, consistent with the spirit and scope of the present invention, TDMA RF technology utilizing IS-36 could be used in the alternative, as well as analog RF technology specified by EIA/TIA-553 or IS-91. The present invention may therefore be practiced utilizing a variety of control channel protocols depending on the particular RF technology implemented within RAN 504.

The MT registration commences when conditions for autonomous registration have been satisfied. As illustrated at step a, MT 502 delivers an IS-95 Registration Message over an access channel to RAN 504. An essential purpose of MT registration is to inform the telecommunications network of the current location of MT 502. Included within the Registration Message are the Mobile Identification Number (MIN) or the International Mobile Subscriber Identification (IMSI), the Electronic Serial Number (ESN) for MT 502, Authentication Result (AUTHR) computed by MT 502, and RANDC corresponding to the random number utilized to compute AUTHR.

Next at step b, RAN 504 delivers the registration information, along with RAND and the location of MT 502, to WMS/SSG/TP 508 in an IS-634 Location Update Request. Within WMS/SSG/TP 508, resides Terminal Proxy (TP) functional means which actually receives the Location Update Request. An important function of the TP is to provide a normalized signaling interface from RAN 504 to WAG 506. After receiving the Location Update Request, the TP functional means within WMS/SSG/TP 508 transforms the message into a normalized format for presentation to the WMS functionality within WMS/SSG/TP 508. Given the variety of RF signaling technologies (TDMA, CDMA, analog, etc.), the normalization occurring within the TP includes transforming the original message from RAN 504 into an RF-technology-independent format. Upon receipt of the normalized message, the WMS functionality then prompts the SSG component to send an AuthenticationRequest INVOKE (AUTHREQ) message to a Home Location Register (HLR) 510 as depicted at step c.

Before delivering the AUTHREQ message, WMS/SSG/TP 508 determines whether MT 502 is an unregistered mobile (UMOB), and also whether the offered IMSI/MIN is that of a valid MT. WMS/SSG/TP 508 next verifies that the received RANDC variable corresponds to the RAND value being broadcast by RAN 504 over its paging channels (such verification could also be implemented within RAN 504). WMS/SSG/TP 508 then determines whether MT 502 has a VLR entry indicating that it has previously registered in any of the RANs served by WMS/SSG/TP 508. If so, WMS/SSG/TP 508 saves the relevant Location Update Request information in the entry (including mobile location), and proceeds to step g; otherwise, WMS/SSG/TP 508 allocates a VLR entry, saves message data therein, and, since this is an initial registration by an authentication-capable mobile, initiates ANSI-41 authentication procedures. WMS/SSG/TP 508 includes IMSI, ESN, RAND, and AUTHR parameters in the ANSI-41 AUTHREQ message to HLR 510. It should be noted that, rather than saving Location Updating Request information in newly allocated VLR entries, WMS/SSG/TP 508 could alternatively save the message itself, and defer allocating a VLR entry until such time as the registration access has been authenticated or authorized.

HLR 510 relays the AUTHREQ to an authentication center (AC) (depicted in FIG. 2 as AC 234), which authenticates the registration access. Assuming a successful registration, and as illustrated at step d, an AuthenticationRequest RETURN RESULT (authreq) message is returned from the AC to HLR 510 and relayed to WMS/SSG/TP 508. It should be noted that, from the perspective of HLR 510, WMS/SSG/TP 508 assumes the role conventionally provided by a VLR. At this point WMS/SSG/TP 508 has determined that authentication was successful and, as illustrated at step e, delivers an ANSI-41 RegistrationNotification (REGNOT) message to HLR 510, populating the message with data saved in the VLR entry of MT 502. The REGNOT's QualificationInformationCode (QUALCODE) parameter requests both validation and subscriber profile information. Such profile information may include IMSI/MIN, ESN as well as applicable user options such as call waiting, three-way call, wide-area roaming, etc. Proceeding to step f, HLR 510 validates the registration access, performs a RegistrationCancellation operation with any prior serving system (an MSC/VLR or another CN, for example), and returns subscriber profile information in a RegistrationNotification RETURN RESULT (regnot) message to WMS/SSG/TP 508.

Next, as illustrated at step g, WMS/SSG/TP 508 verifies that the registration is authorized and, finding that it is, stores the received profile in the VLR entry of MT 502. WMS/SSG/TP 508 returns an IS-634 Location Update Accept message to RAN 504, indicating that the Location Update Request was successfully processed. The mobile registration procedure illustrated in FIG. 5 concludes as illustrated at step h, with the optional step of RAN 504 transmitting a Registration Accepted Order to MT 502 over the paging channel, thus acknowledging the successful registration operation.

Mobile-to-Land Call

Figure 6A:
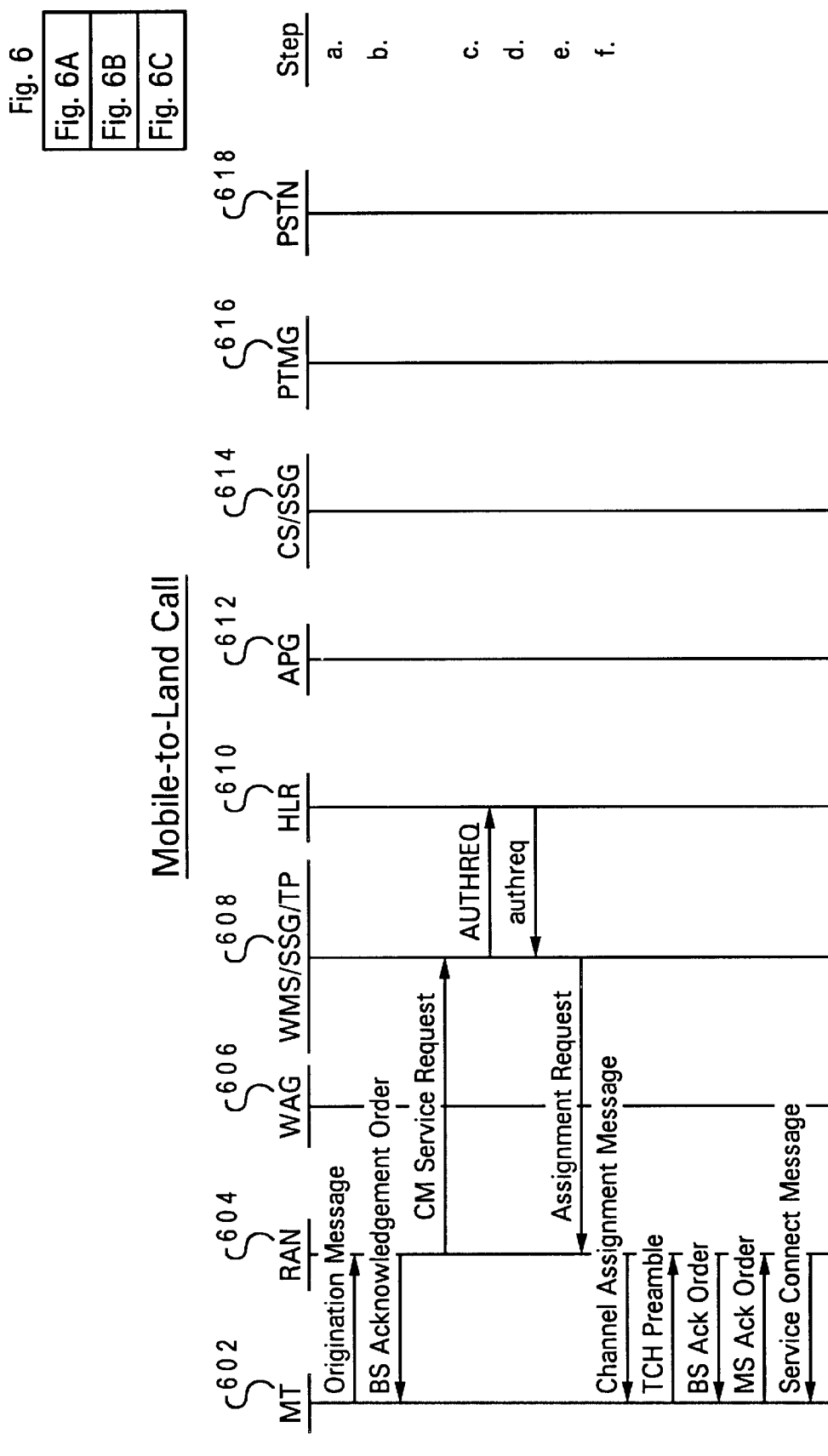
FIG. 6 is a simplified message sequence depicting initialization of a mobile-to-land call in accordance with the method and system of the present invention.
Figure 6B:
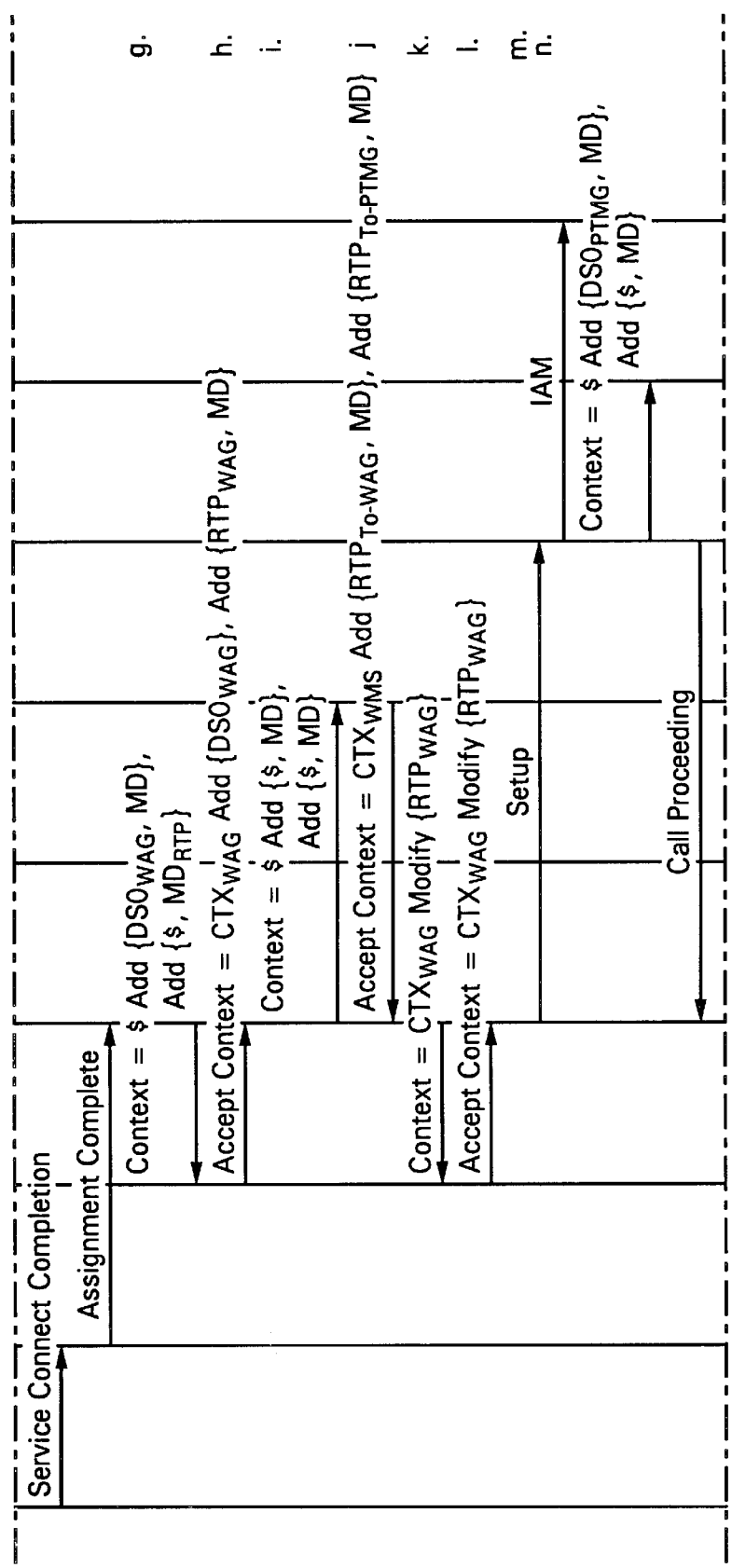
Figure 6C:
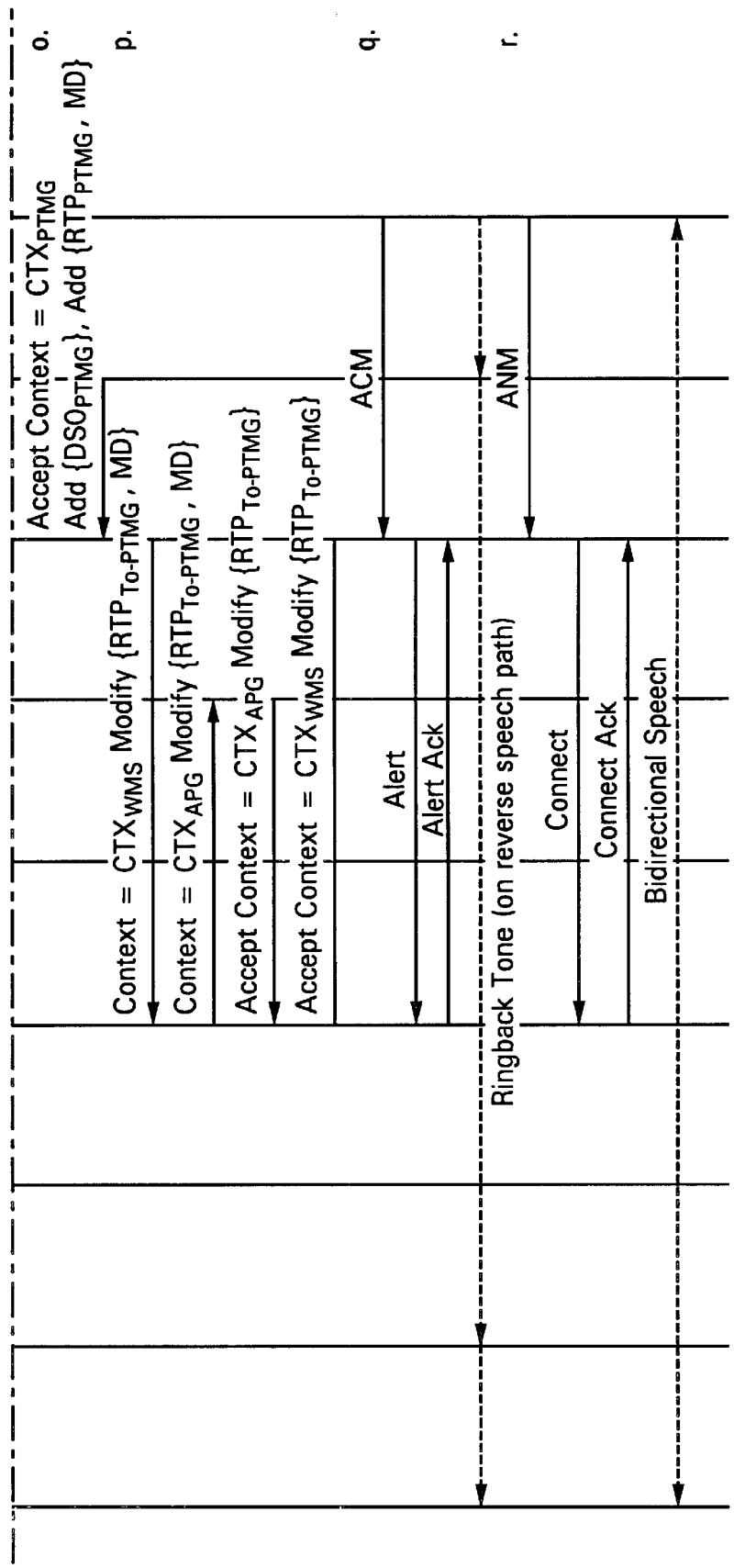

FIG. 6 illustrates a simplified sequence of messages exchanged in accordance with the method and system of the present invention within a telecommunications network during initialization of a mobile-to-land call. The message diagram of FIG. 6 assumes that the mobile-to-land call is initiated by a MT 602 that is already registered (See FIG. 5). It is further assumed that a RAN 604, MT 602, and a WMS/SSG/TP 608 are all authentication-capable. Finally, it is assumed that MT 602 originates the call from the cell in which MT 602 last registered, and that the Origination Message depicted at step a contains the IMSI/MIN and ESN of MT 602, along with RANDC and AUTHR.

The mobile-to-land call commences at step a, with MT 602 delivering an Origination Message to RAN 604 over an access channel. Next, as illustrated at step b, RAN 604 acknowledges receipt of the Origination Message with a Base Station (BS) Acknowledgment (Ack) Order. As part of the same step, RAN 604 constructs a Connection Management (CM) Service Request from the Origination Message data plus RAND and location information, and delivers the IS-634 CM Service Request to a WMS/TP 608.

Upon receipt of the CM Service Request, WMS/TP 608 performs emergency translations on the number dialed by MT 602. If the call is an emergency call (to a Public Safety Answering Point (PSAP), for example), the destination number is obtained from the cell location of MT 602 and the digits dialed by MT 602, and WMS/SSG/TP 608 proceeds to step e. Otherwise, WMS/SSG/TP 608 verifies that the IMSI/MIN is that assigned to a valid MT and retrieves the profile for MT 602 from its VLR entry. Given that the IMSI/MIN and ESN of the CM Service Request matches that in the profile of MT 602, and that service to MT 602 has not been suspended, WMS/SSG/TP 608 stores both location and other information from the CM Service Request in the VLR entry of MT 602 (this could be deferred until after the access has been authenticated). WMS/SSG/TP 608 then verifies that the RANDC variable of the CM Service Request matches the RAND value being broadcast on the paging channel (this verification could be performed alternatively by RAN 604). Assuming a match, WMS/SSG/TP 608 delivers IMSI, ESN, RAND, and AUTHR parameters in an ANSI-41 AUTHREQ to HLR 610 as illustrated at step c. It should be noted that WMS/SSG/TP 608 serves as a VLR from the perspective of HLR 610.

HLR 610 relays the AUTHREQ message to an AC (depicted in FIG. 2 as AC 234) which proceeds to authenticate the origination access. The AC returns an authreq to HLR 610, which relays the authreq message to WMS/SSG/TP 608 as shown at step d. Finding that the origination access has been successfully authenticated, WMS/SSG/TP 608 selects a terrestrial circuit (a DSO channel in a E1 or T1 trunk, for example), to be utilized between the CN and RAN 604, and, as illustrated at step e, conveys this information in an IS-634 Assignment Request to RAN 604. This message includes specification of the desired service option.

At step f, RAN 604 commences an IS-95 messaging exchange with MT 602. During this exchange, MT 602 tunes to a designated traffic channel (TCH), exchanges null traffic data with RAN 604, and processes traffic data in accordance with a specified service option. At the conclusion of this exchange, RAN 604 returns an IS-634 Assignment Complete to WMS/SSG/TP 608.

After TCH assignment, and as illustrated at step g, WMS 608 delivers a MEGACO transaction to WAG 606, which terminates the selected DSO media channel, in order to create a media gateway control protocol (MEGACOP) context for two MEGACOP terminations: one for the selected DSO, and the other for the RTP bearer-path stream to be established between WAG 606 and APG 612. This transaction specifies the termination ID for the DSO, hereinafter referred to as $DSO_{WAG}$. The Media Descriptors (MDs) within the MEGACO transaction describe the properties of each termination and of the media streams to be supported by those terminations. Step h depicts WAG 606 accepting the context creation, supplying Context ID $CTX_{WAG}$ along with the Termination ID $RTP_{WAG}$ for the RTP stream. The MD returned for the RTP termination includes the IP address and UDP port to which an Anchor Packet Gateway (APG) 612 should address packets with bearer data.

As illustrated at step i, WMS 608 delivers a MEGACO transaction to APG 612, in order to create a context for two RTP terminations. One of these RTP terminations is designated for the RTP stream between APG 612 and WAG 606, and the other is for the RTP stream between APG 612 and whichever media gateway or media content server to which CS 614 will soon route the call. The MD for the former RTP termination includes the IP address and UDP port corresponding to $RTP_{WAG}$. Step j illustrates APG 612 accepting the context creation. In so doing, APG 612 supplies context ID $CTX_{APG}$ and Termination IDs $RTP_{TO-WAG}$ and $RTP_{TO-PTMG}$. The MDs returned for each of these terminations includes the IP address and UDP port by which the CN may address bearer data for the corresponding RTP stream.

Proceeding to step k, WMS 608 initiates a MEGACO transaction with WAG 606, in order to provide the IP address and UDP port for $RTP_{TO-WAG}$ to termination $RTP_{WAG}$. WAG 606 accepts the modification to $RTP_{WAG}$ as illustrated at step 1. At this point in the mobile-to-land call setup process, the origination access has been validated, and a path for bearer data between MT 602 and APG 612 has been provided. WMS 608 is now ready to make the origination visible to CS 614.

The WMS functional means within WMS/SSG/TP 608 assumes the functional equivalence of a trunk media gateway (MG) from the perspective of CS 614 over the MEGACO interface. At step m, WMS 608 allocates a pseudo-DSO termination ID ($DSO_{WMS}$) and a WMS context ID ($CTX_{WMS}$), for use in later MEGACO transactions with CS 614. (Note that CS 614 interacts with the pseudo-DSO, as if it was an actual channel on an E1 or T1 trunk.) WMS 608 delivers a Setup message which notifies CS 614 that an origination has been received over pseudo $DSO_{WMS}$. Data conveyed in this Setup message includes the DN of MT 602 from its profile, the called number (generally the same as dialed digits, except for an emergency call), and MEGACO-related information, such as $CTX_{WMS}$ identification, pseudo $DSO_{WMS}$ and $RTP_{TO-PTMG}$ termination IDs, and MDs for these terminations (including the IP address and UDP port associated with $RTP_{TO-PTMG}$). It should be noted that Setup inclusion of $CTX_{WMS}$ and $RTP_{TO-PTMG}$ is a call-setup optimization, to avoid a CS-initiated MEGACO transaction to create a context. (Alternatively, call- and media-control signaling could be decoupled at the expense of an additional MEGACO transaction.)

Prior to step n, CS 614 translates the called number and routes the call to a $DSO_{PTMG}$ of a T1 trunk that terminates at PTMG 616. At step n, CS/SSG 614 delivers an ISUP Initial Address Message (IAM) to a switch (not depicted) within PSTN 618 which terminates the other end of the T1. CS/SSG 614 also delivers a MEGACO transaction to PTMG 616 to create a context with both a $DSO_{PTMG}$ and RTP termination. The MD for the RTP termination provides the address information for $RTP_{TO-PTMG}$. Step n concludes with CS 614 acknowledging the Setup message with a Call Proceeding message. Call Proceeding is required only when there is an inordinate delay in obtaining acceptance of the MEGACO transaction by PTMG 616. Even in the absence of a such a delay, it may be advantageous to deliver the Call Proceeding message to minimize coupling between call- and media-control signaling. Step o depicts PTMG 616 accepting the context creation, and providing context ID $CTX_{PTMG}$, termination ID $RTP_{PTMG}$, and the IP address and UDP port associated with $RTP_{PTMG}$.

Next, step p illustrates a closely correlated messaging sequence between CS/SSG 614, APG 612, and WMS/SSG/TP 608. First, CS 614 conveys the $RTP_{PTMG}$ addressing information to WMS 608 within a MEGACOP command to modify termination $RTP_{TO-PTMG}$ within $CTX_{WMS}$. WMS 608 relays this addressing update within a modification command to APG 612, which responds by modifying termination $RTP_{TO-PTMG}$ within $CTX_{APG}$ and conveying acceptance of the command to WMS 608. WMS 608 relays acceptance of the requested modification to CS 614. A speech path has now been established between MT 602 and termination $DSO_{PTMG}$ of PTMG 616. Next, step q depicts CS/SSG 614 receiving an ISUP Address Complete Message (ACM) message, indicating that the alerting is occurring at the terminating (landline) phone. CS 614 then delivers an Alert message to WMS 608. (WMS 608 could optionally send an IS-634 Alerting to RAN 604 at this point). WMS 608 acknowledges the Alert message. Ringback tone is supplied by the terminating switch on the reverse speech path to MT 602.

The mobile-to-landline call setup concludes at step r which illustrates the final call connect messaging steps. First, CS/SSG 614 receives an ISUP Answer Message (ANM), indicating that the call has been answered. CS/SSG 614 responds by delivering a Connect message to WMS 608. WMS 608 responds with a Connect Acknowledgment, and optionally sends an IS-634 Connect to RAN 604. For implementations in which establishing a bi-directional speech path is deferred until the callee answers, WMS 608 will at this point modify a MEGACO termination of WAG 606 to establish the bi-directional path, with all other CN terminations along the path having already enabled a two-way path. It is assumed in FIG. 6, however, that a bi-directional speech path from MT 602 to the callee's terminal has already been established.

Call Forwarding Unconditional

Figure 7A:
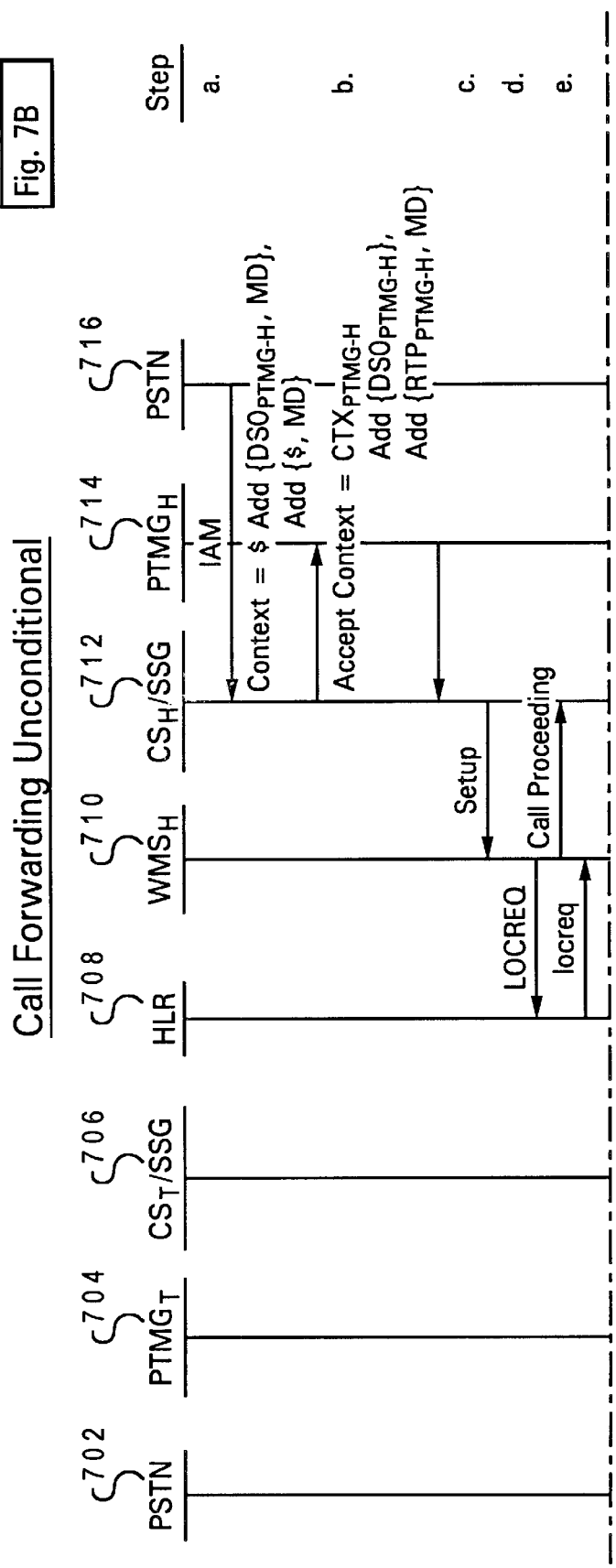
FIG. 7 is a simplified message sequence illustrating Call-Forwarding Unconditional in accordance with the method and system of the present invention.
Figure 7B:
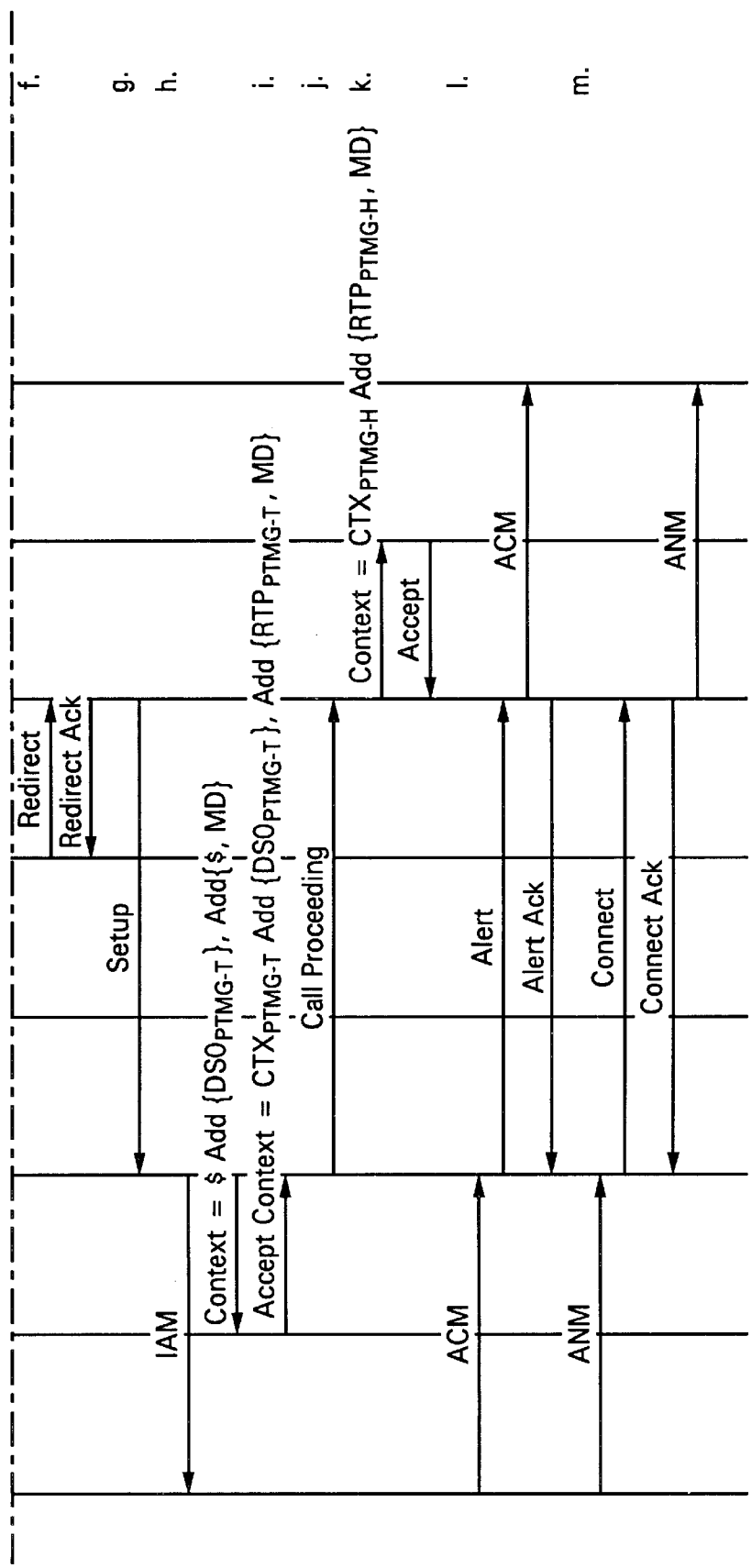

FIG. 7 is a message diagram illustrating a simplified sequence of messages exchanged during initialization of Call-Forwarding Unconditional (CFU) in accordance with the method and system of the present invention. With reference to FIG. 7 the "home CS" ($CS_H$ 712) refers to the CS to which a call is automatically routed when a particular Directory Number (DN) is dialed (A set of DNs, each uniquely assigned to individual MTs, is associated with each CS). Similarly, a set of IMSI/MINs, each assigned to an individual MT, is associated with a particular WMS, designated in FIG. 7 as the "home WMS" ($WMS_H$) for this set of IMSIs/MINs.

The assumptions made with reference to FIG. 7 are as follows. First, it is assumed that a MT (not depicted) has activated its CFU subscriber option. It is also assumed that the best route for the CFU DN is controlled by a $CS_T$ 706. It is further assumed that the home WMS for MT 702 is $WMS_H$ 710. Finally, it is assumed that the originating trunk is $DSO_{PTMG-H}$ on a $PTMG_H$ 714, and that the terminating trunk is $DSO_{PTMG-T}$ on a $PTMG_T$ 704.

CFU commences as illustrated at step a, with $CS_H$/SSG 712 receiving an ISUP IAM message, containing the calling party number, called party number (for a MT with CFU activated), and a Circuit Identification Code (CIC). Based on addressing information within the CIC, $CS_H$/SSG 712 delivers a MEGACO transaction to $PTMG_H$ 714 which manages the identified $DSO_{PTMG-H}$, in order to create a context with termination $DSO_{PTMG-H}$ and an RTP termination. $PTMG_H$ 714 accepts the context creation as shown at step b, supplying context ID $CTX_{PTMG-H}$, termination ID $RTP_{PTMG-H}$, and the IP address and UDP port associated with $RTP_{PTMG-H}$. $CS_H$/SSG 712 translates the called party number, routes the call to pseudo $DSO_{WSM-H}$, and, as shown at step c, delivers a Setup message to $WMS_H$ 710 which manages the pseudo $DSO_{WSM-H}$ port. This Setup message contains the called number (i.e., the DN for a MT), calling number, and pseudo $DSO_{WSM-H}$ identification. It should be noted that the messaging activity taken in association with step c could alternatively be performed concurrently with the MEGACO transaction depicted at step a.

Proceeding to step d, $WMS_H$ 710 maps the DN of the called MT (not depicted) to HLR 708 which maintains the MT's subscriber profile. $WMS_H$ 710 then delivers an ANSI-41 LocationRequest INVOKE (LOCREQ) to HLR 708, and acknowledges the Setup message from $CS_H$ 712 with a Call Proceeding message. Viewing $WMS_H$ 710 as a conventional originating MSC (MSC-O) for this ANSI-41 operation, and finding that CFU has been activated for the called MT, HLR 708 returns the call-forwarding DN associated with the MT to $WMS_H$ 710 at step e in an ANSI-41 Location Request RETURN RESULT (locreq) message. Next, at step f, $WMS_H$ 710 delivers the call-forwarding DN in a Redirect message to $CS_H$ 712, which acknowledges the message with a Redirect Acknowledgment.

$CS_H$ 712 releases pseudo $DSO_{WMS-H}$ for use in a future call, and translates the call-forwarding DN, resulting in a route to the IP address and UDP port for $CS_T$ 706. As illustrated at step g, $CS_H$ delivers a Setup message to $CS_T$ 706. This Setup message includes the call-forwarding DN, calling number, and the IP address and UDP port associated with termination $RTP_{PTMG-H}$. It should be noted that control signaling between CSs 712 and 706 utilizes packet-switched transport within the CN rather than ISUP signaling over the SS7 network, and also specifies the originating RTP termination data instead of a CIC designation for a circuit-switched path. Step h depicts $CS_T$ 706 translating the call-forwarding DN, resulting in the establishment of a route to trunk $DSO_{PTMG-T}$ which terminates on $PTMG_T$ 704. $CS_T$/SSG 706 then delivers an ISUP IAM message to a switch within PSTN 702 which terminates the other end of the trunk. This IAM message contains the call-forwarding DN, calling party number, and CIC for $DSO_{PTMG-T}$.

Proceeding to step i, $CS_T$ 706 delivers a MEGACO transaction to $PTMG_T$ 704 to create a context with termination $DSO_{PTMG-T}$ and an RTP termination. The MD for the RTP termination provides the addressing information for $RTP_{PTMG-H}$. $PTMG_T$ 704 accepts the context creation, supplying context ID $CTX_{PTMG-T}$, termination ID $RTP_{PTMG-T}$, and the IP address and UDP port associated with $RTP_{PTMG-T}$. $CS_T$ 706 delivers a Call Proceeding message to $CS_H$ 712 which provides addressing information for $RTP_{PTMG-T}$, as shown at step j. Next, step k depicts $CS_H$ 712 initiating a MEGACO transaction with $PTMG_H$ 714 to modify termination $RTP_{PTMG-T}$, supplying it with addressing information for $RTP_{PTMG-T}$. $PTMG_H$ 714 accepts the transaction and thus a bi-directional bearer-path has been formed between $DSO_{PTMG-T}$ and the originating exchange.

As illustrated at step 1, after receiving an ISUP ACM message from PSTN 702, $CS_T$/SSG 706 delivers an alert message to $CS_H$ 712, which in turn, sends an ISUP ACM message to the switch within PSTN 716 which delivered the IAM message at step a. $CS_H$ 712 acknowledges the Alert message with an Alert Acknowledgment. Upon receipt of an ISUP ANM message at step m, $CS_T$/SSG 706 delivers a Connect message to $CS_H$/SSG 712 which acknowledges and also sends an ISUP ANM message to the switch within PSTN 716 which sent the IAM message at step a. Call setup is now complete.

Land-to-Mobile Call, Local Termination

Figure 8A:
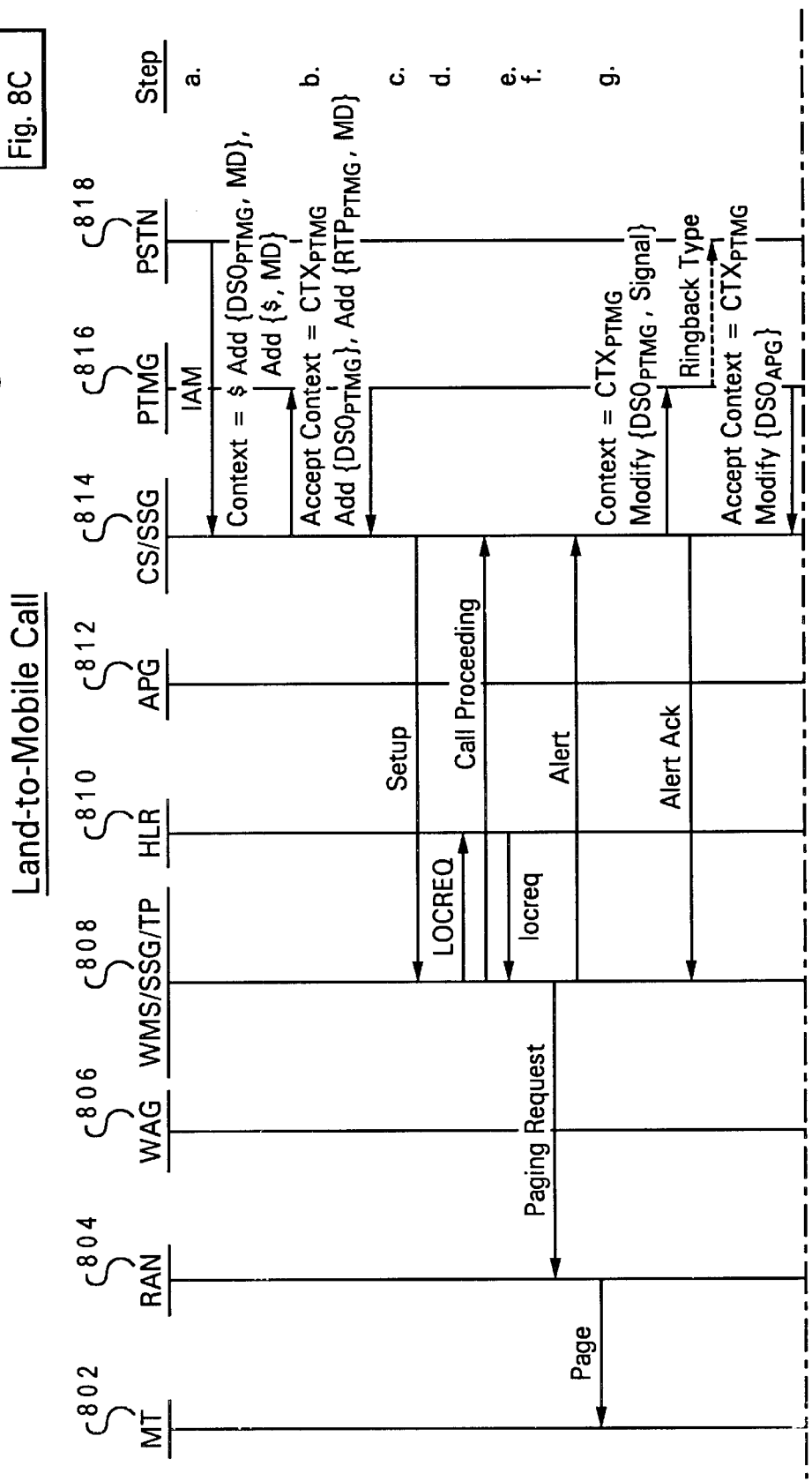
FIG. 8 is a simplified message sequence depicting initialization of a land-to-mobile call having a local termination, in accordance with the method and system of the present invention.
Figure 8B:
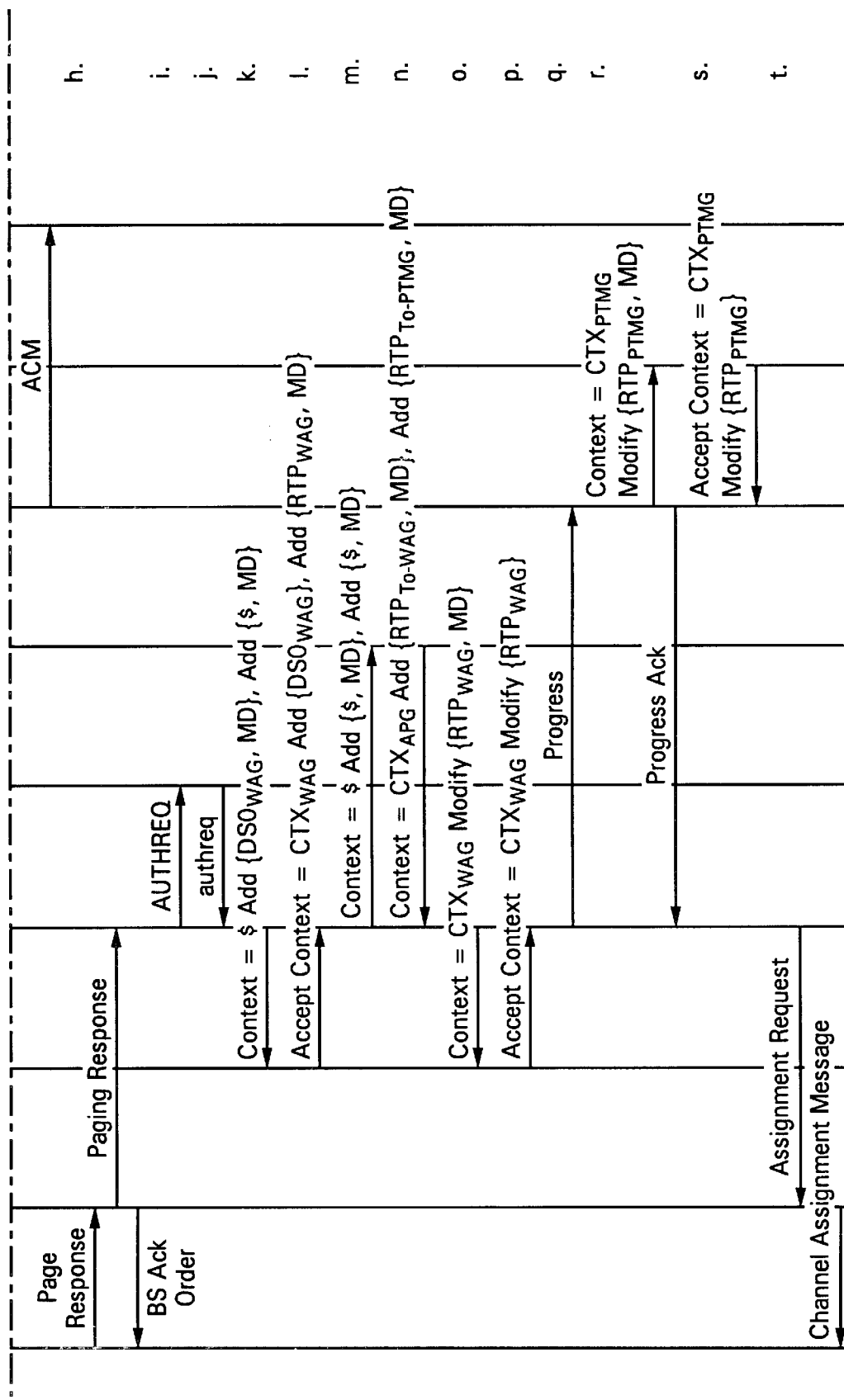
Figure 8C:
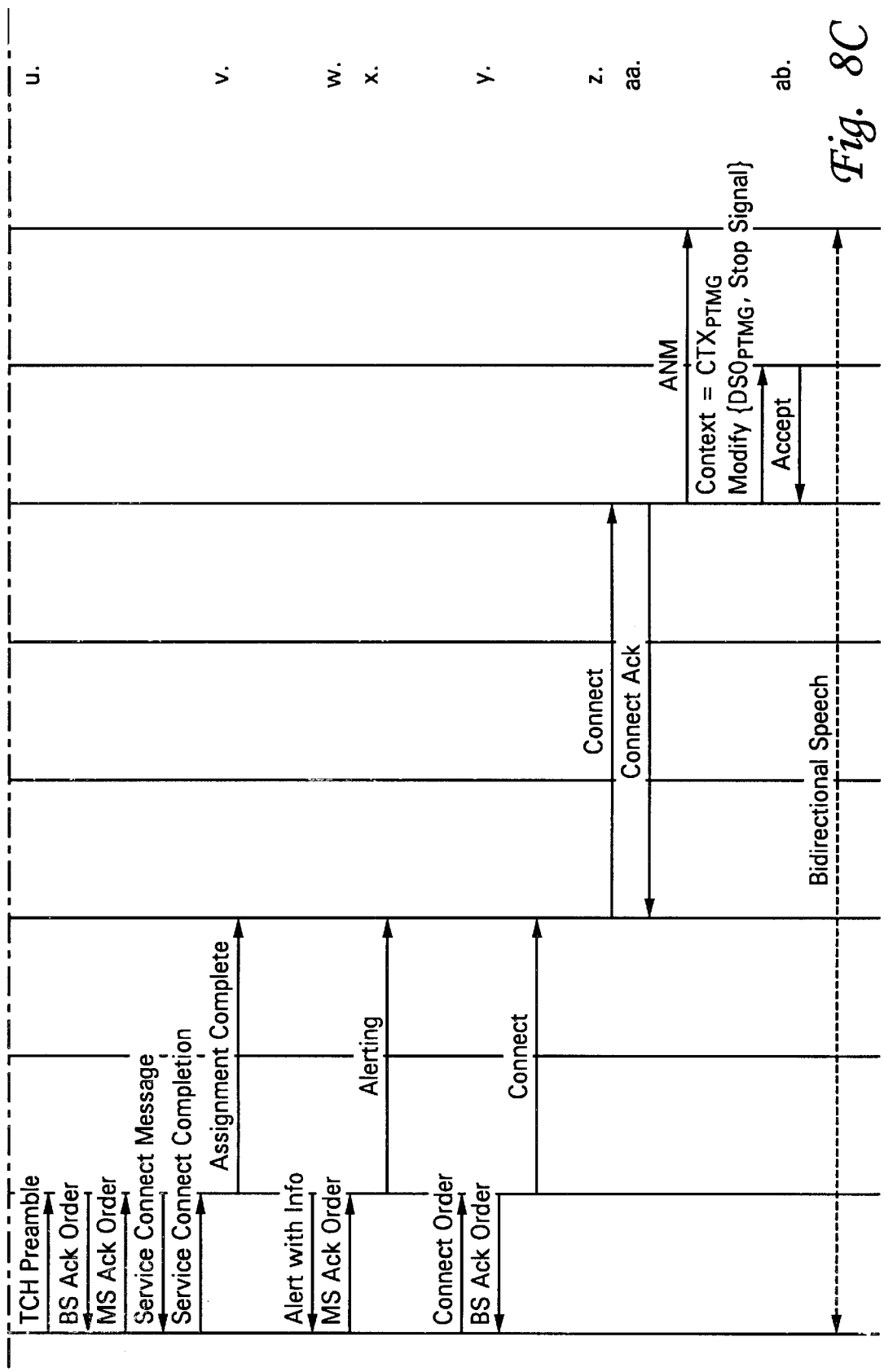

FIG. 8 is a message diagram depicting a simplified sequence of messages exchanged during initialization of a land-to-mobile call having a local termination, in accordance with the method and system of the present invention. It is assumed in FIG. 8 that MT 802 is roaming within the coverage area of its home WMS. In ANSI-41 parlance, the messaging exchange depicted in FIG. 8 is known as a "local termination". Step a depicts a CS/SSG 814 receiving an ISUP IAM message from PSTN 818 which provides the calling party number, called party number (for MT 802), and circuit identification code (CIC). Based on addressing information within the CIC, CS 814 delivers a MEGACO transaction to a PTMG 816 which manages the identified $DSO_{PTMG}$, in order to create a context with termination $DSO_{PTMG}$ and an RTP termination.

Next, at step b, PTMG 816 accepts the context creation, supplying context ID $CTX_{PTMG}$, termination ID $RTP_{PTMG}$, and the IP address and UDP port associated with $RTP_{PTMG}$. CS 814 translates the called party number, routes the call to pseudo $DSO_{WMS}$, and, as depicted at step c, sends a Setup message to a WMS 808 which manages the pseudo $DSO_{WMS}$ port. The setup message contains the called number (DN for MT 802), calling number, pseudo $DSO_{WMS}$ identification, and the IP address and UDP port associated with $RTP_{PTMG}$. Inclusion of the $RTP_{PTMG}$ addressing information enables some of the optimizations noted hereinbelow at the expense of coupling call- and media-control signaling. Such signaling could be uncoupled by introducing an additional MEGACO transaction. It should be noted that the actions within step c could alternatively occur in parallel with the MEGACO transaction at step a. In such a case, the Setup message would not include the $RTP_{PTMG}$ addressing information.

Proceeding to step d, WMS 808 saves the received addressing information (step c) and maps the DN for MT 802 to an HLR 810 which contains the profile for MT 802. WMS 808 then delivers an ANSI-41 LocationRequest INVOKE (LOCREQ) to HLR 810, and acknowledges the Setup message with a Call Proceeding message. From the perspective of HLR 810, WMS 808 appears as to be the originating MSC (MSC-O) for this ANSI-41 operation. Finding that WMS 808 (the apparent MSC-O) is currently serving MT 802 (the MSC-O is also the serving MSC (MSC-S) from the perspective of HLR 810), HLR 810 maps the DN for MT 802 to its IMSI/MIN. HLR 810 then returns the IMSI/MIN for MT 802 in an ANSI-41 LocationRequest RETURN RESULT (locreq) to WMS 808 as depicted at step e.

In the messaging diagram of FIG. 8, WMS 808 has also assumed the functional role of a VLR, and has therefore already stored the subscriber profile of MT 802 during a previous registration by MT 802. WMS 808 determines that MT 802 is not currently busy and retrieves the VLR entry for the received IMSI/MIN. From the VLR entry, WMS 808 determines the identity of a RAN 804 that is currently serving MT 802. Step f illustrates WMS/TP 808 delivering an IS-634 Paging Request to serving RAN 804, which pages MT 802 over the paging channel. WMS 808 then sends an Alert message to CS 814 indicating that MT 802 is not currently busy. Alternatively, the Alert message could be sent when MT 802 responds to a page.

Proceeding to step g, CS 814 directs PTMG 816 to apply ringback to the originator, and PTMG 816 accepts this command. In addition, CS/SSG 814 acknowledges the Alert message and delivers an ISUP ACM to the end office which delivered the IAM at step a. It should be noted that ringback could alternatively be later applied at WAG 806 at the expense of additional delay before the caller hears ringback. Proceeding to step h, MT 802 responds to the page with a Page Response to RAN 804 which then delivers an IS-634 Paging Response to WMS/TP 808. Step i depicts WMS/SSG/TP 808 authorizing the page response by first verifying that the ESN of the page response matches that in the subscriber profile for MT 802. Next, WMS/SSG/TP 808 verifies that the received RANDC value matches the RAND value being broadcast by RAN 804, and if so, delivers an ANSI-41 AuthenticationRequest INVOKE (AUTHREQ) to HLR 810.

HLR 810 relays the AUTHREQ to an AC, which successfully authenticates the page-response access. The AC returns an ANSI-41 AuthenticationRequest RETURN RESULT (authreq) to HLR 810, which, as shown at step j, relays the message to WMS/SSG/TP 808. Finding the page-response access successfully authenticated, WMS/SSG/TP 808 selects a WAG 806 having physical connectivity to serving RAN 804. WMS/SSG/TP 808 then selects a terrestrial circuit $DSO_{WAG}$ between WAG 806 and RAN 804, and as depicted at step k, delivers a MEGACO transaction to WAG 806 to create a context for two terminations: one for $DSO_{WAG}$, and the other for the RTP stream to be established between WAG 806 and APG 812. Step 1 depicts WAG 806 accepting the context creation and supplying context ID $CTX_{WAG}$ along with termination ID $RTP_{WAG}$ for the RTP stream. The MD returned for the RTP termination includes the IP address and UDP port to which APG 812 should address packets with bearer data.

The local termination-to-mobile call setup proceeds at step m at which WMS 808 delivers a MEGACO transaction to APG 812 for the purpose of creating a context for two RTP terminations: one for the RTP stream between APG 812 and WAG 806; and the other for the RTP stream between APG 812 and PTMG 816. The MD for each of these RTP terminations contain the IP address and UDP port for the RTP termination on the other side of the RTP stream (addressing information for $RTP_{WAG}$ and $RTP_{PTMG}$). Step n depicts APG 812 accepting the context creation and supplying context ID $CTX_{APG}$ and termination IDs $RTP_{TO-WAG}$ and $RTP_{TO-PTMG}$. The MDs returned for each of these terminations includes the IP address and UDP port associated with the termination. Next, step o illustrates WMS 808 delivering a MEGACO transaction to WAG 806 to supply the $RTP_{TO-WAG}$ addressing information to termination RTP-$_{WAG}$. As shown at step p, WAG 806 accepts the modification to $RTP_{WAG}$.

The call setup procedure illustrated at step q may follow or occur simultaneously with step o. First, WMS 808 allocates context ID $CTX_{WMS}$ for later MEGACO transactions with CS 814. Next, WMS 808 associates $CTX_{WMS}$ with pseudo-DSO termination ID $DSO_{WMS}$, and sends a Progress message to CS 814, containing $CTX_{WMS}$, pseudo $DSO_{WMS}$, $RTP_{TO-PTMG}$ and the IP address and UDP port corresponding to $RTP_{TO-PTMG}$. Next, as illustrated at step r, CS 814 delivers a MEGACO transaction to PTMG 816 to supply the $RTP_{PTMG}$ termination with the IP address and UDP port corresponding to $RTP_{TO-PTMG}$. CS 814 also acknowledges the Progress message with a Progress Acknowledgment. Step s depicts PTMG 816 accepting the modification to termination $RTP_{PTMG}$. Next at step t, WMS 808 sends an IS-634 Assignment Request to RAN 804, to request assignment of radio and terrestrial resources. Step t may be performed concurrently with step m or o. This Assignment Request message specifies terrestrial circuit $DSO_{WAG}$ to be utilized between WAG 806 and RAN 804, as well as the desired service option.

Step u illustrates an IS-95 messaging sequence exchanged between RAN 804 and MT 802. At the conclusion of this exchange, MT 802 has tuned to the designated TCH, is exchanging null traffic data with RAN 804, and is processing traffic in accordance with the specified service option. Media-path connectivity is now established between MT 802 and $DSO_{PTMG}$. Since the radio traffic channel and terrestrial circuit have been established, RAN 804 returns an IS-634 Assignment Complete to WMS/TP 808, as depicted at step v.

Next, as illustrated at step w, RAN 804 initiates ringing at MT 802, and optionally sends an IS-634 Alerting message to WMS/TP 808. At step x, WMS/TP 808 may initiate a no-answer timer. The call is answered at MT 802, and as depicted at step y, MT 802 responds by delivering a Connect Order to RAN 804 over the reverse TCH. RAN 804 delivers an IS-634 Connect message to WMS/TP 808 indicating that the call has been answered. Next, at step z, WMS 808 delivers a Connect message to CS 814, indicating that the call has been answered.

At step aa CS 814 responds to the WMS 808 Connect message with a Connect Acknowledgment. Next, CS/SSG 814 delivers an ISUP ANM message to the originating switch within PSTN 818, and also sends a MEGACO transaction to PTMG 816 to stop ringback tone and "cut through" speech. The local termination-to-mobile call setup depicted in FIG. 8 concludes as illustrated at step ab with PTMG 816 accepting the modification to termination $DSO_{PTMG}$. There has thus been established an end-to-end bi-directional speech path.

Inter-WMS Termination

Figure 9B:
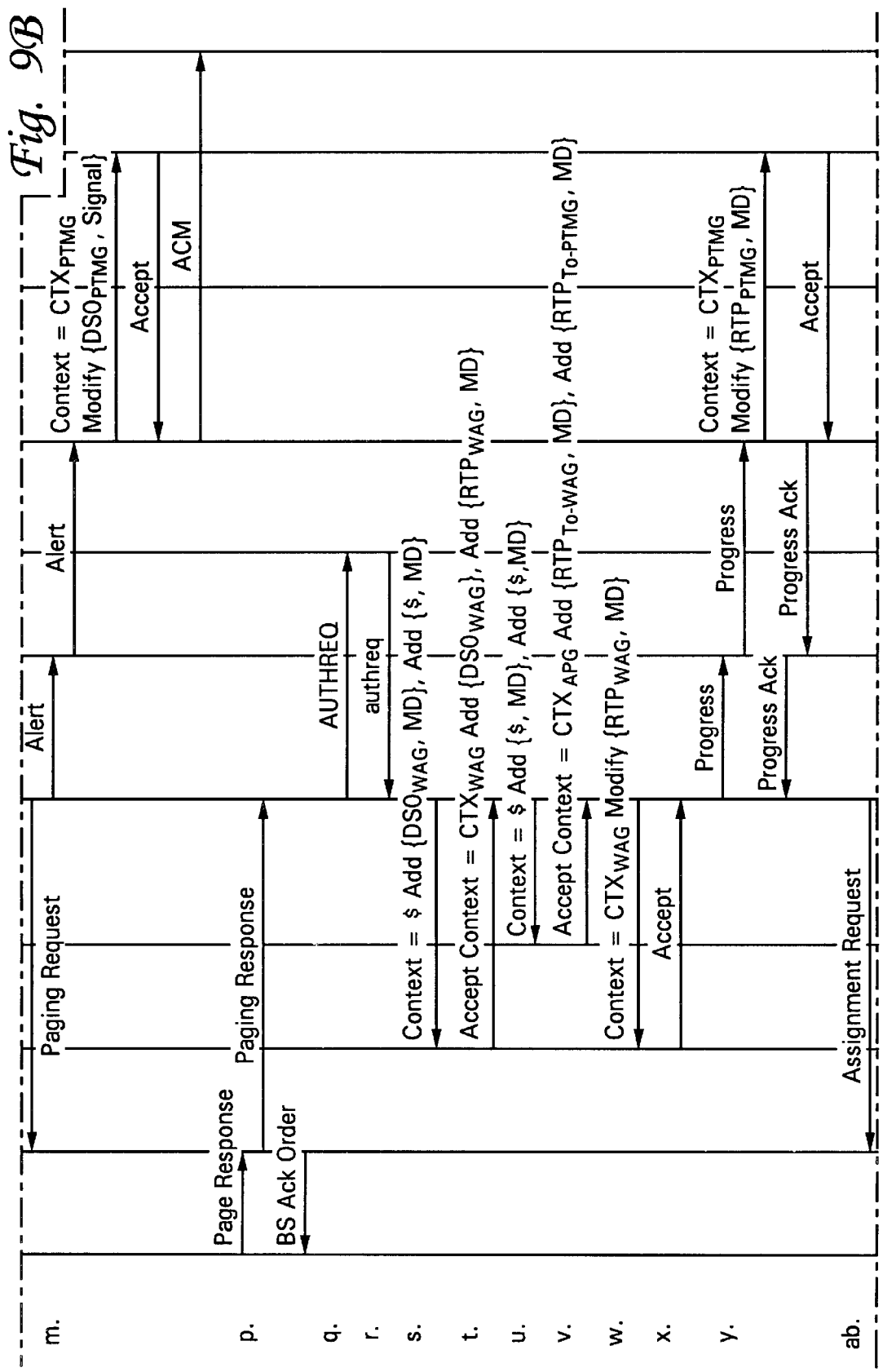
FIG. 9 is a simplified message sequence illustrating initialization of an inter-WMS termination, in accordance with the method and system of the present invention.
Figure 9C:
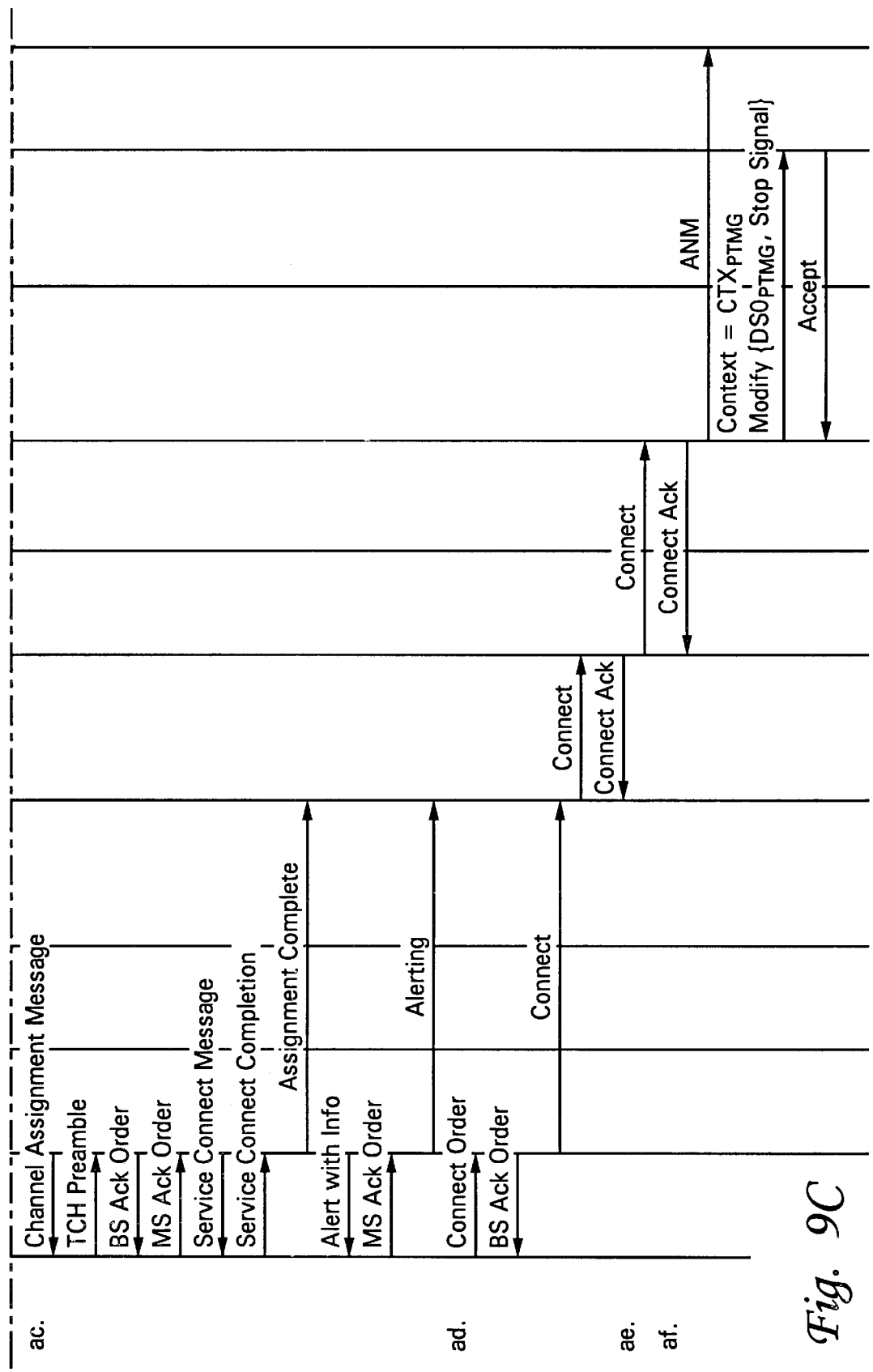

FIG. 9 is a message diagram illustrating a simplified sequence of messages exchanged during initialization of an inter-WMS termination, in accordance with the method and system of the present invention. The entities comprising a CN in FIG. 9 include WAG 906, APG 908, $WMS_S$/SSG/TP 910, $CS_S$ 912, $CS_H$/SSG 916, $WMS_H$/SSG 918, and PTMG 920. An inter-WMS termination is analogous to a conventional ANSI-41 Intersystem Termination in most respects except that unlike the conventional Intersystem Termination, the inter-WMS termination depicted in FIG. 9 is performed entirely within the CN itself. From the inter-WMS termination sequence illustrated in FIG. 9, those skilled in the art will appreciate and understand how the CN may interact with the public cellular network to accomplish an intersystem termination. In such a circumstance the CN may function in either an originating or serving MSC/VLR capacity.

It should be noted that, with respect to FIG. 9, each CS is provided with a set of Temporary Local Directory Numbers (TLDNs) for call delivery purposes. Each CS is designed to translate TLDNs of the other CSs. Unlike other DNs, TLDNs always translate and route (within the CN) to the internet domain name (or IP address) and UDP port of the CS from which it originates. Finally, it should be noted that a WMS serving area is the geographical area served by a set of RANs which convey signaling information to a single WMS via one or more Terminal Proxies (TPs).

The following assumptions are made with respect to FIG. 9. First, it is assumed that a MT 902 has roamed outside of the serving area of its home WMS, into that of another WMS within the same CN. $CS_H$ and $WMS_H$ refer to the home CS and home WMS respectively. In ANSI-41 parlance, the combined functionality of $CS_H$ 916 and $WMS_H$ 918 correspond to the functionality of an originating MSC/VLR (MSC-O/VLR). It is further assumed that a $WMS_S$ 910 (serving WMS), is that WMS in whose serving area MT 902 is currently roaming. A serving call server, $CS_S$ 912, provides a Temporary Local Directory Number (TLDN) for call delivery. $WMS_S$ 910 and $CS_S$ 912 together provide, in ANSI-41 parlance, serving MSC functionality. It is further assumed that $WMS_S$ 910 stores a copy of the subscriber profile for MT 902 in its VLR.

The inter-WMS termination message sequence begins as depicted at step a, with $CS_H$/SSG 916 receiving an ISUP IAM, containing the calling party number, called party number, and circuit identification code (CIC). Based on addressing information within the CIC, $CS_H$ 916 delivers a MEGACO transaction to a PTMG 920 which manages the identified $DSO_{PTMG}$, to create a context with termination $DSO_{PTMG}$ and an RTP termination. Next, at step b illustrates PTMG 920 accepting the context creation and supplying context ID $CTX_{PTMG}$, termination ID $RTP_{PTMG}$, and the IP address and UDP port associated with $RTP_{PTMG}$. $CS_H$ 916 translates the called party number, routes the call to pseudo $DSO_{WMS-H}$, and, as shown at step c, delivers a Setup message to $WMS_H$ 910, which manages the pseudo $DSO_{WMS-H}$ port. This Setup message contains the called number (i.e., a DN for MT 902), calling number, pseudo $DSO_{WMS-H}$ identification, and the IP address and USP port associated with $RTP_{PTMG}$.

The inter-WMS termination proceeds at step d, with $WMS_H$ 918 mapping the DN for MT 902 to an HLR 914 which contains the subscriber profile for MT 902. $WMS_H$ 918 then delivers a LOCREQ to HLR 914, and acknowledges the Setup message with a Call Proceeding message. HLR 914 views $WMS_H$ 918 as the functional equivalent of an originating MSC (MSC-O) in this ANSI-41 transaction. Upon determining that MSC-O ($WMH_H$ 918) is not currently serving MT 902, HLR 914 delivers an ANSI-41 RoutingRequest INVOKE message (ROUTREQ) to $WMS_S$ 910 (the serving WMS) as shown at step e. This ROUTREQ message includes a specification of the MIN/IMSI for MT 902. It should be noted that $WMS_S$ 910 and $CS_S$ 912 present the appearance of a serving MSC/VLR (MSC-S/VLR) to the public cellular network (not depicted). Upon receipt of the ROUTREQ, $WMS_S$ 910 verifies that it is still serving MT 902, and also that MT 902 is not currently engaged in a call. $WMS_S$ 910 then delivers a TLDN Request message to $CS_S$ 912 as depicted at step f, in order to obtain a TLDN. $CS_S$ 912 allocates a TLDN, and delivers it to $WMS_S$ 910 in the TLDN Response message illustrated at step g. Utilizing an internal data structure, $CS_S$ 912 maps the TLDN to the requesting $WMS_S$ 910. $WMS_S$ 910 maps the TLDN to the IMSI/MIN received in the ROUTREQ, also utilizing an internal data structure. As shown at step h, $WMS_S$ 910 then delivers the TLDN in an ANSI-41 Routing Request RETURN RESULT (routreq) to HLR 914, which responds by returning the TLDN to $WMS_H$ 918 in a locreq message at step i.

Next, as illustrated at step j, $WMS_H$ 918 responds to finding that another system ($WMS_S$, 910 and $CS_S$, 912) is serving MT 902, by sending a Redirect message to $CS_H$ 916. This Redirect message contains the TLDN. $CS_H$ 916 then frees pseudo $DSO_{WMS-H}$ for use in a future call, translates the TLDN, resulting in a route to the IP address and UDP port corresponding to $CS_S$ 912, and acknowledges the Redirect message with a Redirect acknowledgment.

Proceeding to step k, $CS_H$ 916 delivers a Setup message which contains the TLDN, calling number, and the IP address and UDP port associated with $RTP_{PTMG}$, to $CS_S$ 912. It should be noted that signaling functionality between CSs utilizes packet-switched transport within the CN rather than ISUP signaling over the SS7 network, and also specifies originating RTP termination data instead of a CIC DSO designation. Alternatively, SS7 signaling could be utilized between CSs and associated SSGs, without departing from the spirit or scope of the present invention. At step 1, $CS_S$ 912 translates the TLDN and, finding that it maps to $WMS_S$ 910, routes the call to pseudo trunk $DSO_{WMS-S}$. It should be noted that, from the perspective of $CS_S$ 912, $WMS_S$ 910 is a media gateway that terminates pseudo $DSO_{WMS-S}$. $CS_S$ 912 delivers a Setup message to $WMS_S$ 910 that contains the TLDN, calling number, pseudo $DSO_{WMS-S}$ identification, and the IP address and UDP port associated with $RTP_{PTMG}$. The $RTP_{PTMG}$ addressing information is an optimization that obviates an additional MEGACO transaction, as noted with reference to FIG. 8.

From within its internal data structure, $WMS_S$ 910 utilizes a TLDN-to-IMSI/MIN mapping to obtain the IMSI/MIN for MT 902, and again verifies that MT 902 is not engaged in a call. $WMS_S$ 910 also determines from the VLR entry of MT 902 that RAN 904 is currently serving MT 902. Step m depicts $WMS_S$/TP 910 delivering an IS-634 Paging Request to serving RAN 904 which pages MT 902 over the paging channel. $WMS_S$ 910 then delivers an Alert message to $CS_S$ 912, indicating that MT 902 is not currently busy. (Alternatively, the Alert message could be sent when MT 902 responds to a page. $WMS_S$ 910 would then deliver a Call Proceeding message to $CS_S$ 912 to acknowledge receipt of the Setup message, resulting in triggering deallocation of the TLDN by $CS_S$ 912.) As shown at step n, $CS_S$ 912 relays the Alert message to $CS_H$ 916, and frees the TLDN for use in other calls.

Proceeding to step o, $CS_H$ 916 directs PTMG 920 to apply ringback to the originator, and PTMG 920 accepts the command. $CS_H$/SSG 916 also delivers an ISUP ACM to the office which sent the IAM. Next, step p depicts MT 902 responding to the page with a Page Response message. RAN 904 then delivers an IS-634 Paging Response to $WMS_S$/TP 910. As illustrated at step q, WMS/TP/SSG 910 authorizes the page request as follows: first by verifying that the ESN of the page response matches that in the profile; next, by verifying that the RANDC value matches the RAND value being broadcast by RAN; and finally, by sending an ANSI-41 AuthenticationRequest INVOKE (AUTHREQ) to HLR 914. HLR 914 relays the AUTHREQ to its AC (not depicted), which successfully authenticates the page response access. AC returns an ANSI-41 authreq to HLR 914, which relays the message to $WMS_S$/SSG 910 as shown at step r.

WMS$_S$ 910, finding that the page-response access has been successfully authenticated, selects a WAG 906 with physical connectivity to serving RAN 904 and selects a terrestrial circuit DSO$_{WAG}$ between the WAG 906 and RAN 904. Step s depicts WMS$_S$ 910 delivering a MEGACO transaction to WAG 906 to create a context for two terminations: one for DSO$_{WAG}$, and the other for the RTP stream to be established between WAG 906 and APG 908. At step t, WAG 906 accepts the context creation, supplying context ID CTX$_{WAG}$ along with termination ID RTP$_{WAG}$ for the RTP stream. The MD returned for the RTP termination includes the IP address and UDP port to which APG 908 should address packets with bearer data.

The inter-WMS termination continues at step u, with WMS$_S$ 910 delivering a MEGACO transaction to APG 908, for the purpose of creating a context for two RTP terminations: one for the RTP stream between APG 908 and WAG 906; and the other for the RTP stream between APG 908 and PTMG 920. The MD for each of these RTP terminations contain the IP address and UDP port for the RTP termination on the other side of the RTP stream (i.e., addressing information for RTP$_{WAG}$ and RTP$_{PTMG}$). Step v illustrates APG 908 accepting the context creation and supplying context ID CTX$_{APG}$ and termination IDs RTP$_{TO-WAG}$ and RTP$_{TO-PTMG}$. The MDs returned for each of these terminations includes the IP address and UDP port associated with the termination.

Next, at step w, WMS$_S$ 910 delivers a MEGACO transaction to WAG 906 to supply the RTP$_{TO-WAG}$ addressing information to termination RTP$_{WAG}$. WAG 906 accepts the modification to RTP$_{WAG}$ as illustrated at step x. WMS$_S$, 910 allocates context ID CTX$_{WMS}$ for later MEGACO transactions with CS$_S$ 912, associates CTX$_{WMS}$ with pseudo-DSO termination ID DSO$_{WMS-S}$, and, as illustrated at step y, delivers a Progress message to CS$_S$ 912 containing CTX$_{WMS}$ and the IP address and UDP port corresponding to RTP$_{TO-PTMG}$. The actions performed at step y may be performed concurrently with those performed at step w. Step z depicts CS$_S$, 912 delivering a Progress message to CS$_H$ 916 which includes the IP address and UDP port corresponding to RTP$_{TO-PTMG}$, and acknowledging receipt of the Progress message.

Proceeding to step aa, CS$_H$ 916 delivers a MEGACO transaction to PTMG 920 for the purpose of supplying the RTP$_{PTMG}$ termination with the IP address and UDP port corresponding to RTP$_{TO-PTMG}$, and acknowledging receipt of the Progress message. PTMG 920 accepts the modification to termination RTP$_{TO-PTMG}$. At step ab, which may be performed concurrently with step u, w, or y, WMS$_S$/TP 910 delivers an IS-634 Assignment Request to RAN 904, to request assignment of radio resources. This request message specifies the terrestrial circuit (i.e., DSO$_{WAG}$) to be utilized between WAG 906 and RAN 904, as well as the desired service option. Step ac depicts RAN 904 commencing an exchange of IS-95 messages with MT 902. At the conclusion of this exchange, MT 902 has tuned to the designated traffic channel, is exchanging null traffic with RAN 904, and is processing traffic in accordance with the specified service option. Media-path connectivity is now established between MT 902 and DSO$_{PTMG}$. Since the radio TCH and circuit have been established, RAN 904 returns an IS-634 Assignment Complete to WMS$_S$/TP 910. RAN 904 initiates ringing at MT 902, and optionally delivers an IS-634 Alerting message to WMS/TP 910.

Proceeding to step ad, the call is answered at MT 902, which responds by sending an IS-95 Connect Order to RAN 904 over the reverse TCH. RAN 904 delivers an IS-634 Connect message to WMS$_S$/TP 910 indicating that the call has been answered. Step ae depicts WMS$_S$/TP 910 delivering a Connect message to CS$_S$ 912 signifying that the call has been answered. CS$_S$ 912 responds to WMS$_S$ 910 with a Connect Acknowledgment, and relays the Connect message to CS$_H$ 916 as shown at step af. CS$_H$ 916 responds to CS$_S$ 912 as shown at step ag with a Connect Acknowledgment CS$_H$/SSG 916 also delivers an ISUP ANM message to the originating switch, and delivers a MEGACO transaction to PTMG 920 to stop the ringback tone and "cut through" speech. Finally, as depicted at step ah, PTMG 920 accepts the modification to termination DSO$_{PTMG}$. There has now been created an end-to-end bi-directional speech path.

Inter-WAG Hard Handoff (HHO)

Figure 10A:
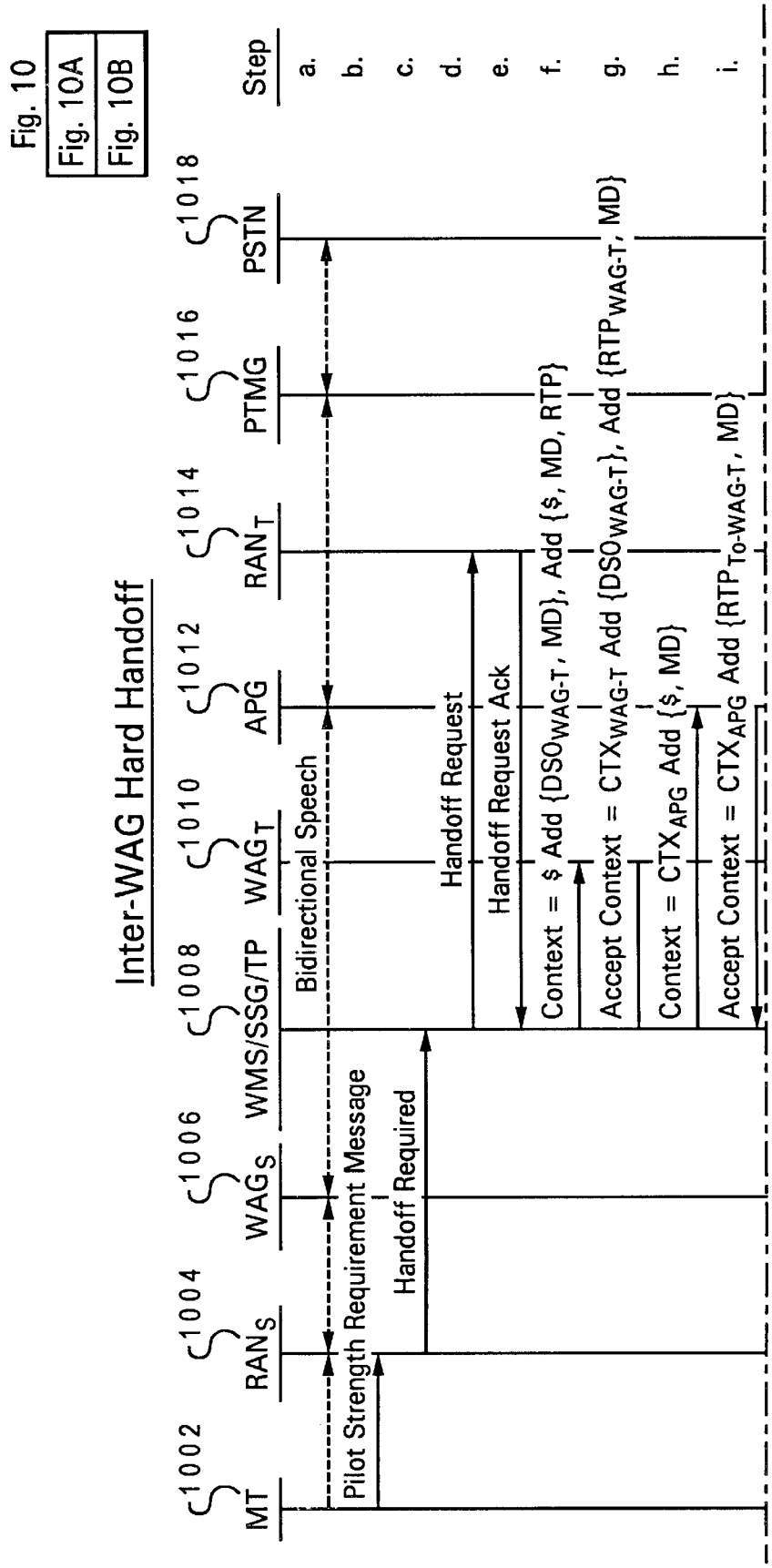
FIG. 10 is a simplified message sequence depicting initialization of an inter-WAG Hard Handoff (HHO) in accordance with the method and system of the present invention.
Figure 10B:
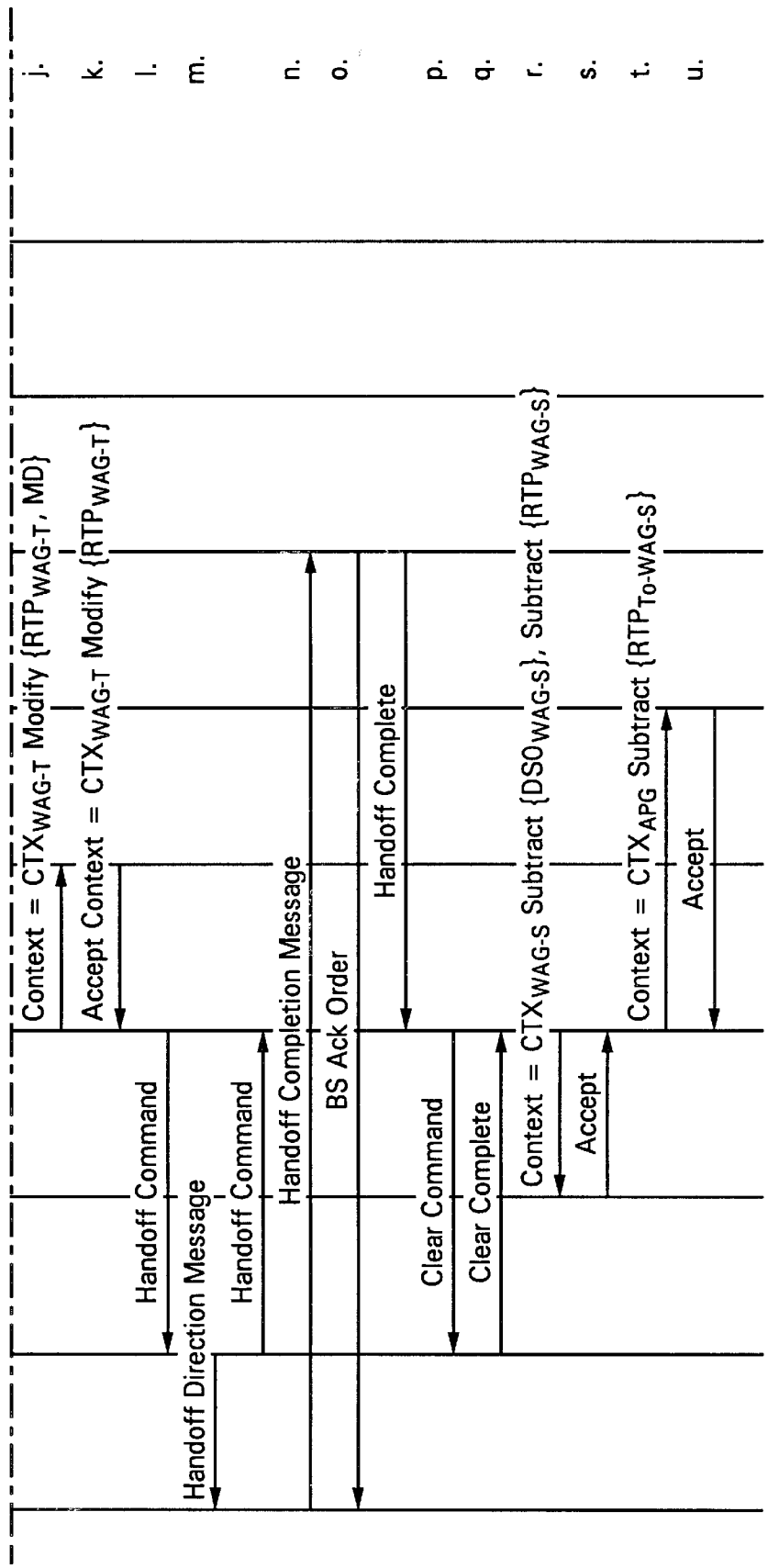

FIG. 10 is a telecommunications messaging diagram illustrating an exemplary sequence of steps performed during an inter-WAG Hard Handoff (HHO) in accordance with the method and system of the present invention. The following conditions are to be assumed with reference to FIG. 10 and its accompanying description. First, it is assumed that a Land-to-Mobile (L2M) or Mobile-to-Land (M2L) call has already been setup and established. It is further assumed that the source and target RANs are not the same, and that each RAN is served by a different WAG. These source and target WAGs and RANs are identified in FIG. 10 as WAG$_S$ 1006, RAN$_S$ 1004, WAG$_T$ 1010, and RAN$_T$ 1014. The context and termination IDs of this call are the same as those depicted in FIG. 8, with the exception that CTX$_{WAG}$, DSO$_{WAG}$, RTP$_{WAG}$, and RTP$_{TO-WAG}$, described with reference to FIG. 8, are now CTX$_{WAG-S}$. DSO$_{WAG-S}$, RTP$_{WAG-S}$, and RTP$_{TO-WAG-S}$ respectively. Finally, it is assumed that a single WMS serves as the media gateway controller (MGC) for both WAGs.

Prior to handoff, and illustrated at step a, a MT 1002 is communicating with another terminal. Anticipating possible handoff, MT 1002 continuously monitors the pilot strengths of potential handoff target cells as well as those in the active set. The strength of the only pilot in the active set has fallen below a specified threshold; thus, as depicted at step b, MT 1002 delivers an IS-95 Pilot Strength Measurement message to the currently serving RAN$_s$ 1004. RAN$_s$ 1004 is the source RAN in the inter-WAG handoff depicted in FIG. 10. The Pilot Strength Measurement message contains the pilot strength of active and candidate target cells.

Noting that MT 1002 intends to drop its last current active PN offset, and also noting that one or more candidate target cells are outside of its domain, RAN$_s$ 1004 delivers an IS-634 Handoff Required message to a WMS/TP 1008 as shown at step c. This message contains a list of candidate target cells, along with their pilot strengths, recommends a hard handoff (HHO), and requests that WMS 1008 find a target cell with an available radio channel. Having determined that the target cell is in the domain of the target RAN (RAN$_T$) 1014, WMS 1008 delivers an IS-634 Handoff Request message to RAN$_T$ 1014, as illustrated at step d. This Handoff Request message identifies the DSO channel (DSO$_{WAG-T}$) of the target WAG (WAG$_T$) 1010 that will provide connectivity between RAN$_T$ 1014 and WAG$_T$ 1010. RAN$_T$ 1014 allocates and prepares appropriate radio and terrestrial resources for the requested handoff, begins transmitting null data on the allocated forward TCH, and, as shown at step e, sends an IS-634 Handoff Request Acknowledge message to WMS/TP 1008. This message provides the information that MT 1002 will need to execute the handoff.

Next at step f, WMS 1008 delivers a MEGACO transaction to WAG$_T$ 1010 in order to create a context for two terminations: one for selected $DSO_{WAG-T}$, and the other for the RTP stream to be established between $WAG_T$ 1010 and the APG 1012. The MDs associated with each termination describe the properties of the termination and of the media stream to be supported by the termination. It should be noted that step f may be performed concurrently with step d. Step g depicts $WAG_T$ 1010 accepting the context creation and supplying Context ID $CTX_{WAG-T}$ along with the Termination ID $RTP_{WAG-T}$ for the RTP stream. The MD returned for the RTP termination includes the IP address and UDP port to which APG 1012 should address packets with bearer data.

As depicted at step h, WMS 1008 delivers a MEGACO transaction to APG 1012, in order to add an RTP termination to context $CTX_{APG}$. The MD for the termination specifies the IP address and UDP port of $RTP_{WAG-T}$. Next at step i, APG 1012 accepts the change to context $CTX_{APG}$ and supplies Termination ID $RTP_{TO-WAG-T}$, along with a corresponding MD that specifies the IP address and UDP port by which $WAG_T$ 1010 may address this termination. WMS 1008 then delivers a MEGACO transaction to $WAG_T$, in order to modify termination $RTP_{WAG-T}$. The MD specifies the IP address and UDP port associated with $RTP_{TO-WAG-T}$. $WAG_T$ 1010 responds by accepting this modification as shown at step k. There is now a bi-directional speech path between $RAN_T$ 1014 and the landline terminal (not depicted), with APG 1012 sending voice data from the terminal to both $WAG_S$ 1006 and $WAG_T$ 1010.

The inter-WAG HHO proceeds at step l, which illustrates WMS/TP 1008 sending an IS-634 Handoff Command message to $RAN_S$ 1004. This message conveys information that MT 1002 will utilize to acquire the selected TCH of $RAN_T$ 1014. Step m depicts $RAN_S$ 1004 delivering an IS-95 Handoff Direction message to MT 1002 and providing information that MT 1002 will utilize to obtain the selected TCH of $RAN_T$ 1014. $RAN_S$ 1004 then delivers an IS634 Handoff Commenced message notifying WMS/TP 1008 that MT 1002 has been ordered to move to the target TCH. MT 1002 stops transmitting on the current TCH, begins transmitting over the reverse TCH allocated by the target cell in $RAN_T$ 1014, and sends an IS-95 Handoff Completion message to $RAN_T$ 1014, as shown at step n. Step o illustrates $RAN_T$ 1014 delivering an IS-634 Handoff Complete message notifying WMS/TP 1008 that MT 1002 has successfully completed the handoff.

WMS/TP 1008 delivers an IS-634 Clear Command to $RAN_S$ 1004 (step e), which responds by releasing radio and terrestrial resources associated with the call, and by delivering an IS-634 Clear Complete to WMS/TP 1008 (step q). Concurrently with step p, WMS/TP 1008 delivers a MEGACO transaction to $WAG_S$ 1006 (step r) to subtract all terminations from context $CTX_{WAG-S}$. Next at step s, $WAG_S$ 1006 removes the terminations from context $CTX_{WAG-S}$ as directed, deletes the context itself, and delivers a message to WMS/TP 1008 indicating acceptance of the Subtract commands. Concurrently with step p, WMS/TP 1008 delivers a MEGACO transaction to APG 1012 (step t) in order to remove termination $RTP_{TO-WAG-S}$ from context $CTX_{APG}$. Finally, as illustrated at step u, APG 1012 removes the requested termination from its context, and signals acceptance of the command.

It is important to note that the inter-WAG HHO depicted in FIG. 10 demonstrates the manner in which WMS 1008 and APG 1012 "hide" handoff-related details from other functional elements in the CN on the control and bearer planes respectively. It should also be noted that the inter-WAG HHO depicted in FIG. 10 is functionally equivalent to an inter-BSC HHO in a conventional MSC/VLR environment.

Inter-WMS Handoff

Figure 11A:
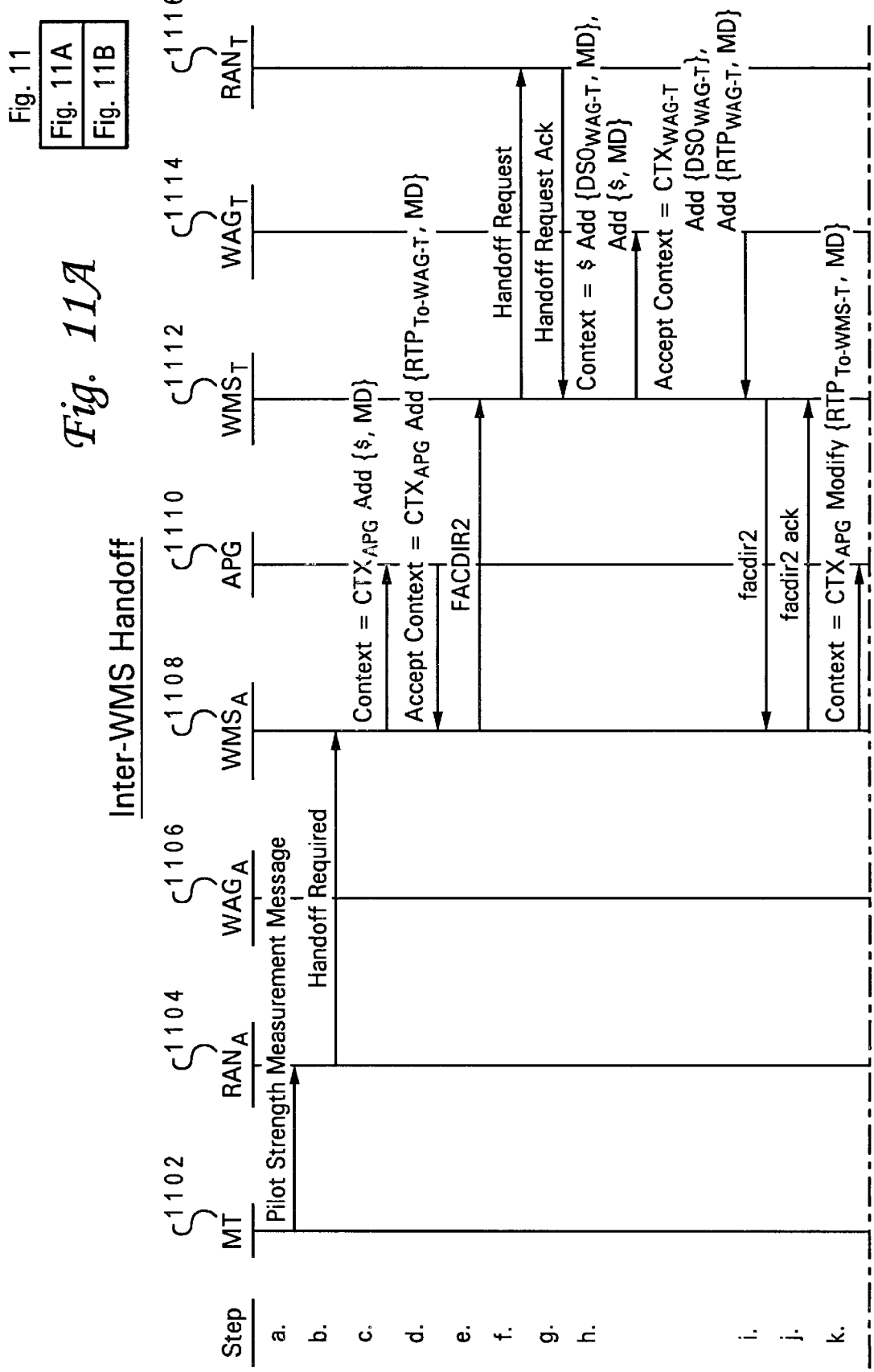
FIG. 11 is a simplified message sequence illustrating initialization of an inter-WMS handoff in accordance with the method and system of the present invention.
Figure 11B:
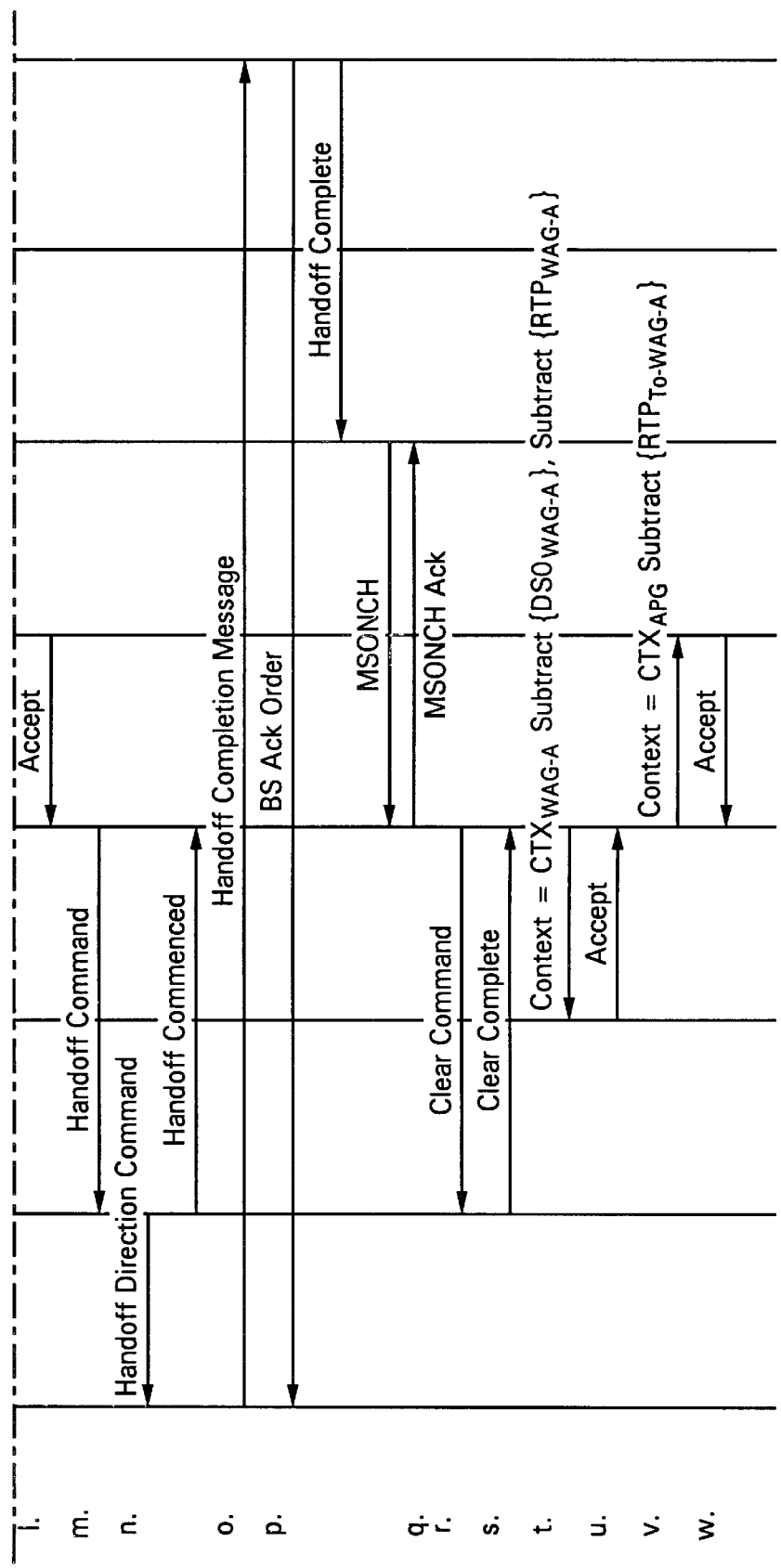

FIG. 11 is a simplified message sequence illustrating initialization of an inter-WMS handoff in accordance with the method and system of the present invention. As in FIGS. 5 through 10, several contextual assumptions are made in FIG. 11. First, it is assumed that a L2M or M2L call has already been setup and established in accordance with the M2L and L2M call setup procedure depicted in FIG. 6 or 8, respectively. No handoff has occurred so far, thus, the serving WMS, WAG, and RAN also serve as the anchor WMS, WAG, and RAN, and are designated hereinbelow as $WMS_A$ 1108, $WAG_A$, 1106, and $RAN_A$ 1104. MEGACO contexts $CTX_{WMS-A}$, $CTX_{WAG-A}$, and $CTX_{APG}$, have been established within $WMS_A$ 1108, $WAG_A$ 1106, and APG 1110 in accordance with call setup depicted in FIG. 6 or 8. Similarly, the termination IDs for the current call are: $DSO_{WAG-A}$ and $RTP_{WAG-A}$ in $CTX_{WAG-A}$; pseudo $DSO_{WMS-A}$ and $RTP_{TO-PTMG}$ in $CTX_{WMS-A}$; and $RTP_{TO-PTMG}$ and $RTP_{TO-WAG-A}$ in $CTX_{APG}$. The "target cell" is assumed to be contained within a $RAN_T$ 1116 other than $RAN_A$ 1104. $RAN_T$ 1116 shares connectivity with a target WAG ($WAG_T$ 1114). The MGC for $WAG_T$ 1114 is a WMS other than $WMS_A$ 1108, referred to hereinafter as $WMS_T$ 1112.

Regarding FIG. 11, it is important to note that WMS entities 1108 and 1112 and APG 1110 serve to effectively "hide" handoff-related details from other functional elements in the CN on the control and bearer planes respectively. It should further be noted that the inter-WMS handoff illustrated in FIG. 11 is analogous in many respects to an intersystem handoff in a conventional MSC/VLR environment. Prior to the inter-WMS handoff, a MT 1102 continuously monitors the pilot strengths of potential handoff target cells as well as of those in the active set. The strength of the only pilot in the active set has fallen below a specified threshold, making it difficult to support the desired quality of service (QoS). The inter-WMS handoff thus commences at step a which depicts MT 1102 delivering an IS-95 Pilot Strength Measurement message to the currently serving $RAN_A$ 1104. $RAN_A$ 1104 serves as the "anchor" RAN in an inter-WAG, inter-WMS handoff. The Pilot Strength Measurement message contains the pilot strength of active and candidate target cells.

Noting that MT 1102 intends to drop its last current active PN offset, and also noting that the cell indicated by the strongest Pilot PN sequence offset index is inaccessible to itself, $RAN_A$ 1104 delivers an IS-634 Handoff Required message to $WMS_A$ 1108. This message includes a list of candidate target cells and their pilot strengths. The Handoff Required message also recommends a hard handoff (HHO), and requests that $WMS_A$ 1108 find a target cell with an available radio channel. After determining that the target cell is in the domain of $WMS_T$ 1112, $WMS_A$ 1108 delivers a MEGACO transaction to APG 1110 (step c), in order to add an RTP termination to context $CTX_{APG}$. At step d, APG 1110 accepts this change, and supplies Termination ID $RTP_{TO-WAG-T}$, along with a corresponding MD that specifies the IP address and UDP port by which $WAG_T$ 1114 may later address this termination.

The inter-WMS handoff continues at step e, with $WMS_A$ 1108 delivering the equivalent of an IS-41 FacilitiesDirective2 INVOKE message (FACDIR2), directing $WMS_T$ 1112 to initiate a Handoff-Forward task. This message includes identification of MT 1102 (i.e., IMSI/MIN and ESN), billing ID for billing correlation, target cell, and the IP address and UDP port corresponding to APG termination $RTP_{TO-WAG-T}$.

The IP address and UDP port information is not included within the ANSI-41 standard, but instead replaces the InterMSCCircuitID parameter that would otherwise be utilized in a circuit-switched network context. It should be noted that the FACDIR2 message, as well as other inter-WMS messages may be conveyed over either the CN or the SS7 network. (Recall that WMS functional elements present the appearance of a MSC/VLR to the ANSI-41 SS7 network. Inter-WMS communication over the SS7 network would necessitate that each WMS be provisioned with the point codes [PCs] for the other WMSs).

Noting that the target cell is in the domain of the target RAN, $RAN_T$ 1116, $WMS_T$ 1112 delivers an IS-634 Handoff Request message to $RAN_T$ 1116 (step f). The Handoff Request message identifies the DSO channel of $WAG_T$ 1114 ($DSO_{WAG-T}$) that will provide connectivity between $RAN_T$ 1116 and $WAG_T$ 1112. Next, at step g, $RAN_T$ 1116 allocates and prepares the appropriate radio and terrestrial resources for handoff. $RAN_T$ 1116 then begins transmitting null data on the allocated forward TCH, and delivers an IS-634 Handoff Request Acknowledge message to $WMS_T$ 1112. This message provides the information that MT 1102 will need to execute the handoff. Next, at step h (possibly performed concurrently with step f), $WMS_T$ 1112 delivers a MEGACO transaction to $WAG_T$ 1114, to create a context for two terminations: one for selected $DSO_{WAG-T}$, and the other for the RTP stream to be established between $WAG_T$ 1114 and APG 1110. The MD for the RTP termination includes the IP address and UDP port corresponding to APG termination $RTP_{TO-WAG-T}$. Step i depicts $WAG_T$ 1114 accepting the context creation and supplying Context ID $CTX_{WAG-T}$ along with the Termination ID $RTP_{WAG-T}$ for the RTP stream. The MD returned for $RTP_{WAG-T}$ includes the IP address and UDP port to which APG 1110 should address packets with bearer data.

Proceeding to step j, $WMS_T$ 1112 delivers the equivalent of an ANSI-41 FacilitiesDirective2 RETURN RESULT (facdir2) to $WMS_A$ 1108. This message contains information that MT 1102 will need to acquire the TCH that has been allocated by $RAN_T$ 1116, as well as the IP address and UDP port corresponding to termination $RTP_{WAG-T}$. (The IP address and UDP port information has no parametric equivalent in an ANSI-41 facdir2). Next, as depicted at step k, $WMS_A$ 1108 acknowledges the facdir2 message, and delivers a MEGACO transaction to APG 1110, in order to modify termination $RTP_{TO-WAG-T}$. The MD specifies the IP address and UDP port associated with $RTP_{WAG-T}$. $WAG_T$ 1114 accepts the modification as shown at step 1. At this point in the handoff process, there is a bi-directional speech path between $RAN_T$ 1116 and the landline terminal, with APG 1110 sending voice data from the landline terminal to both $WAG_A$ 1106 and $WAG_T$ 1114.

Step m, which may be performed concurrently with step k, illustrates $WMS_A$/TP 1108 delivering an IS-634 Handoff Command to $RAN_A$ 1104 conveying information that MT 1102 will utilize in acquiring the selected TCH of $RAN_T$ 1116. Next, as depicted at step n, $RAN_A$ 1104 sends an IS-95 Handoff Direction Message to MT 1102, providing the TCH information that MT 1102 will need. $RAN_A$ 1104 then delivers an IS-634 Handoff Commenced message, to notify $WMS_A$ 1108 that MT 1102 has been ordered to move to the targeted TCH.

MT 1102 now terminates transmission over the current TCH and commences transmission over the reverse TCH allocated by the target cell in $RAN_T$ 1116. As shown at step o, MT 1102 delivers an IS-95 Handoff Completion message to $RAN_T$ 1116. Next, step p depicts $RAN_T$ 1116 delivering an IS-634 Handoff Complete message, thereby notifying $WMS_T$/TP 1112 that MT 1102 has successfully completed the handoff. As illustrated at step q, $WMS_T$/TP 1112 responds by sending the functional equivalent of an ANSI-41 MobileOnChannel (MSONCH) to $WMS_A$ 1108, indicating that the handoff has been completed. At step r, $WMS_A$/TP 1108 acknowledges the MSONCH, and delivers an IS-634 Clear Command to $RAN_A$ 1104. $RAN_A$ 1104 responds, as shown at step s, by releasing radio and terrestrial resources associated with the call, and sends an IS-634 Clear Complete to $WMS_A$ 1108.

Possibly occurring simultaneously with step r is step t which depicts $WMS_A$/TP 1108 delivering a MEGACO transaction to $WAG_A$ 1106, in order to subtract all terminations from context $CTX_{WAG-A}$. Next, at step u, $WAG_A$ 1106 removes the terminations from the context $CTX_{WAG-A}$ as directed, deletes the context itself, and then delivers a message to $WMS_A$/TP 1108 indicating acceptance of the Subtract commands. Possibly occurring concurrently with step r or step t, step v illustrates $WMS_A$/TP 1108 delivering a MEGACO transaction to APG 1110, in order to remove termination $RTP_{TO-WAG-A}$ from context $CTX_{APG}$. Finally, step w illustrates APG 1110 removing the requested termination from its context, and signaling acceptance of the command.

Call Release Initiated by MT

FIG. 12 is a simplified message sequence depicting a call release initiated by a mobile terminal in accordance with the method and system of the present invention. It is assumed in FIG. 12 that a L2M or M2L call has been setup and established such that the same WMS (WMS 1208) provides MGC functionality for both the APG 1212 and WAG 1206 involved in the call. The context and termination IDs are the same as those specified in FIG. 8.

The call release commences at step a, with MT 1202 delivering an IS-95 Release Order over the reverse traffic channel to a RAN 1204 to initiate call clearing. Next at step b, RAN 1204 sends an IS-634 Clear Request to a WMS/TP 1208, requesting that the call be cleared. WMS/TP 1208 responds as illustrated at step c by delivering a Disconnect message to CS 1214, advising CS 1214 that the party accessed by pseudo $DSO_{WMS}$ has left the call, and requesting permission to release resources related to pseudo $DSO_{WMS}$. CS 1214, finding no reason to block release of call resources related to pseudo $DSO_{WMS}$ (no call is on hold, for example), sends a Release message to WMS 1208, as illustrated at step d. For real-time optimization precluding the need for a separate MEGACO transaction, CS 1214 specifies in the Release message that terminations pseudo $DSO_{WMS}$ and $RTP_{TO-PTMG}$ should be removed from context $CTX_{WMS}$. It should be noted that this optimization is performed at the expense of further coupling media-control and call-control signaling. After determining that it is appropriate to clear the call (i.e., no other feature, such as Over-The-Air Parameter Administration (OTAPA), is currently utilizing the TCH in addition to the voice call being cleared), WMS/TP 1208, delivers an IS-634 Clear Command to RAN 1204 (step e), instructing RAN 1204 to release resources associated with the cell. RAN 1204 responds at step f by releasing the terrestrial circuit associated with the call, acknowledging MT 1202 by sending an IS-95 Release Order over the forward TCH, releasing radio resources related to the call, and sending an IS-634 Clear Complete message to WMS/TP 1208.

Proceeding to step g which may be performed concurrently with step e, WMS 1208 initiates a MEGACO transaction with APG 1212, to remove terminations $RTP_{TO-WAG}$ and $RTP_{TO-PTMG}$ from context $CTX_{APG}$. Step h depicts APG 1212 deleting terminations $RTP_{TO-WAG}$ and $RTP_{TO-PTMG}$ and context $CTX_{APG}$, and conveying acceptance of the Subtract commands to WMS 1208. Continuing at step i (which may be performed concurrently with step e or g), WMS 1208 removes termination $DSO_{WMS}$ from context $CTX_{WMS}$, deletes $CTX_{WMS}$, and delivers a Release Complete to CS 1214. This Release Complete message informs CS 1214 that trunk channel pseudo $DSO_{WMS}$ is now idle, and that context $CTX_{WMS}$ and $RTP_{TO-PTMG}$ have been deleted. As illustrated at step J, which may also be performed in parallel with step e, g, or i, WMS 1208 initiates a MEGACO transaction with WAG 1206, to remove terminations $DSO_{WAG}$ and $RTP_{WAG}$ from context $CTX_{WAG}$.

Proceeding to step k, WAG 1206 removes termination $DSO_{WAG}$ from context $CTX_{WAG}$, deletes termination $RTP_{WAG}$, deletes context $CTX_{WAG}$, and conveys acceptance of the Subtract commands to WMS 1208. Next, step 1 depicts CS 1214 initiating a MEGACO transaction with PTMG 1216, to remove terminations $DSO_{PTMG}$ and $RTP_{PTMG}$ from context $CTX_{PTMG}$. Step 1 may be performed concurrently with step d. As shown at step m, PTMG 1216 deletes termination $RTP_{PTMG}$, removes termination $DSO_{PTMG}$ from context $CTX_{PTMG}$, deletes $CTX_{PTMG}$, and conveys acceptance of the Subtract commands to CS 1214. Proceeding to step n, CS/SSG 1214 delivers an ISUP Release (RLS) message to the switch within PSTN 1218 which terminates the T1 trunk that includes the channel represented by $DSO_{PTMG}$. It should be noted that step n should follow step m, in order to preclude a race condition, wherein an origination might be received for $DSO_{PTMG}$, and the trunk channel has not yet been idled. Finally, step o illustrates CS/SSG 1214 receiving an ISUP Release Complete (RLC) message from the switch, indicating that trunk $DSO_{PTMG}$ has been idled.

Call Release Initiated by PSTN

FIG. 13 is a message sequence illustrating a PSTN-initiated call release in accordance with the method and system of the present invention. It is assumed in FIG. 13 that a L2M or M2L call that has been setup and established utilizes the same WMS 1306 to provide MGC functionality for both the APG 1310 and WAG 1304 which function as media gateways for the call. The context and termination IDs are the same as those specified in FIG. 8.

The PSTN initiated call release commences at step a with a CS/SSG 1312 receiving an ISUP RLS message for trunk channel $DSO_{PTMG}$ CS 1312 responds at step b with a MEGACO transaction to a PTMG 1314, ordering PTMG 1310 to remove terminations $DSO_{PTMG}$ and $RTP_{PTMG}$ from context $CTX_{PTMG}$. Step c depicts PTMG 1314 deleting termination $RTP_{PTMG}$, removing termination $DSO_{PTMG}$ from context $CTX_{PTMG}$, deleting $CTX_{PTMG}$, and conveying acceptance of the Subtract commands back to CS 1312. At step d, CS/SSG 1312 delivers an ISUP RLC message to the sender (within PSTN 1316) of the RLS message, indicating that trunk $DSO_{PTMG}$ has been idled. (This step should follow step c to preclude a race condition in which an origination might be received for $DSO_{PTMG}$, but the trunk channel had not yet been idled.)

Finding no reason to block release of resources associated with pseudo $DSO_{WMS}$ (no call on hold, for example), CS 1312 delivers a Release message to WMS 1306 as shown at step e (possibly concurrently with step b). As an optimization that obviates a separate MEGACO transaction, the Release message specifies removal of terminations $DSO_{WMS}$ and $RTP_{TO-PTMG}$ from context $CTX_{WMS}$.

Proceeding to step f, WMS 1306 initiates a MEGACO transaction with APG 1310, ordering APG 1310 to remove terminations $RTP_{TO-WAG}$ and $RTP_{TO-PTMG}$ from context $CTX_{APG}$. Step g depicts APG 1310 deleting terminations $RTP_{TO-WAG}$ and $RTP_{TO-PTMG}$, as well as context $CTX_{APG}$, and conveying acceptance of the Subtract commands back to WMS 1306. At step h (possibly concurrently with step f), WMS 1306 removes termination $DSO_{WMS}$ from context $CTX_{WMS}$, deletes the context, and delivers a Release Complete message to CS 1312. This Release Complete message informs CS 1312 that trunk pseudo $DSO_{WMS}$ has been idled, and that context $CTX_{WMS}$ and $RTP_{TO-PTMG}$ have been deleted. Proceeding to step i, WMS 1306 initiates a MEGACO transaction with WAG 1304, in order to remove terminations $DSO_{WAG}$ and $RTP_{WAG}$ from context $CTX_{WAG}$. Like step h, step i may be performed concurrently with step f.

Continuing at step j, WAG removes termination $DSO_{WAG}$ from context $CTX_{WAG}$, deletes termination $RTP_{WAG}$, deletes context $CTX_{WAG}$, and conveys acceptance of the Subtract commands to WMS 1306. Finding no reason to block release of RAN 1303 resources related to the call (i.e., no other feature, such as OTAPA, is currently utilizing the TCH in addition to the voice call being cleared), and as illustrated at step k, WMS/TP 1306 delivers an IS-634 Clear Command instructing RAN 1303 to release resources associated with the call. Step k may be performed concurrently with step f. RAN 1303 responds at step 1 by releasing the terrestrial circuit associated with the call, and initiating call clearing over the air interface by transmitting an IS-95 Release Order over the forward TCH. Step m depicts MT 1302 acknowledging the Release Order by delivering an IS-95 Release Order over the reverse TCH. Finally, as illustrated at step n, RAN 1303 releases radio resources related to the call, and delivers an IS-634 Clear Complete message to WMS/TP 1306.

Preferred implementations of the invention include implementations as a network of computer systems programmed to execute the method or methods described herein, and as program products. According to the computer system implementation, sets of instructions for executing the method and system of the present invention are resident in a storage device such as the random access memory (RAM) of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at one computer and transmitted when desired to another computer by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 5 through 13 can be accomplished with a computer-aided device. In such a method, data stored in a memory unit of a data-processing system such as a data-processing system, can represent steps in a method for implementing a preferred embodiment of the present invention.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A switching control infrastructure within a telecommunications environment for providing distributed, packet-switched management of call setup, mobility, and data transfer for a mobile terminal, wherein said telecommunications environment includes a bearer plane for establishing an end-to-end user data interface and a control signaling plane consisting of a media control subplane and a call control subplane, said switching control infrastructure comprising:

a radio access network (RAN) including an air-interface transceiver in communication with said mobile terminal; and a packet-switched core network of nodes including:

a wireless access gateway (WAG) providing bearer-path connectivity within said bearer plane between said RAN and said core network;

a wireless mobility server (WMS) operating within said control signaling plane for controlling said bearer-path connectivity within said WAG; and a packet-switching backbone network providing packet-switched communication transport facilities of said bearer plane and said control plane within said core network.

2. The switching control infrastructure of claim 1, wherein said RAN consists of components effecting Global System for Mobile Communications (GSM), Time Division Multiple Access (TDMA), Code Division Multiple Access (CDMA), or analog RF technology.

3. The switching control infrastructure of claim 2, wherein said analog RF technology may be characterized as among a group consisting of EIA/TIA-553 and IS-91.

4. The switching control infrastructure of claim 1, wherein said WMS comprises a media gateway controller for controlling bearer-path connectivity for said WAG within said media control subplane.

5. The switching control infrastructure of claim 1, wherein said WAG comprises:

a RAN channel termination for providing bearer-path connectivity between said RAN and said WAG; and a packet-switched channel termination for providing bearer-path connectivity between said WAG and said packet-switching backbone network.

6. The switching control infrastructure of claim 5, wherein said WAG further comprises a media gateway providing data connectivity and interworking between said RAN channel and said packet-switched channel.

7. The switching control infrastructure of claim 1, wherein said core network further comprises a terminal proxy (TP) providing communicative contact between said RAN and said WMS within said control signaling plane, and wherein said TP comprises a signaling gateway for exchanging RF-technology-specific signaling protocols with said RAN and RF-technology-independent signaling protocols with said WMS.

8. The switching control infrastructure of claim 7, wherein said WMS together with said TP present the appearance of a mobile switching center (MSC) to said RAN within said control signaling plane.

9. The switching control infrastructure of claim 1, wherein said telecommunications environment includes a public cellular network, and wherein said core network further comprises a Signaling System 7 (SS7) signaling gateway (SSG) providing communicative contact between said WMS and said public cellular network within said control signaling plane.

10. The switching control infrastructure of claim 9, wherein said WMS together with said SSG present the appearance of a MSC/VLR to said public cellular network utilizing TCAP SS7 signaling.

11. The switching control infrastructure of claim 10, wherein said TCAP SS7 signaling consists of either ANSI-41 signaling or GSM Mobile Application Part (MAP) signaling.

12. The switching control infrastructure of claim 1, wherein said telecommunications environment further includes a public switched telephone network (PSTN), and wherein said core network further comprises:

a PSTN trunking media gateway (PTMG) providing bearer-path connectivity between said PSTN and said core network; and a call server (CS) in communicative contact with said PTMG for controlling said bearer-path connectivity within said PTMG.

13. The switching control infrastructure of claim 12, wherein said CS comprises a media gateway controller for controlling bearer-path connectivity within said PTMG.

14. The switching control infrastructure of claim 12, wherein said CS and said WMS divide call-control logic into CS call-control logic and WMS call-control logic.

15. The switching control infrastructure of claim 14, wherein said WMS call-control logic includes all of said call control logic related to mobility and wireless-ness of said mobile terminal, and wherein said CS call control logic includes all of said call control logic related to call-control signaling to and from said CS.

16. The switching control infrastructure of claim 12, wherein said CS call control logic is derived from a Class-5 switch which provides line services within said PSTN, such that said CS may provide line services to said mobile terminal.

17. The switching control infrastructure of claim 12, wherein said PTMG comprises:

a PSTN channel termination for providing bearer-path connectivity between said PSTN and said PTMG; and a packet-switched channel termination for providing bearer-path connectivity between said PTMG and said packet-switching backbone network.

18. The switching control infrastructure of claim 17, wherein said PTMG further comprises a media gateway providing data connectivity and interworking between said PSTN channel and said packet-switched channel.

19. The switching control infrastructure of claim 1, wherein said core network further comprises:

a media content server providing conferencing and announcements; and an anchor packet gateway (APG) for terminating bearer-path channels from said WAG and either another WAG, said PTMG, or said media content server, within said bearer plane.

20. The switching control infrastructure of claim 19, wherein said WMS operates within said media control subplane to control connectivity of said bearer path terminations within said APG.

21. The switching control infrastructure of claim 19, wherein said APG further comprises a media gateway providing data connectivity and interworking between bearer path terminations.

22. The switching control infrastructure of claim 1, wherein said packet-switching backbone network is an ATM-based backbone utilizing ATM cell switching for switching packets within said core network.

23. The switching control infrastructure of claim 22, wherein said ATM-based backbone utilizes AAL1 or AAL2 as a bearer path transport mechanism.

24. The switching control infrastructure of claim 1, wherein said packet-switching backbone network is an IP-based backbone utilizing IP routing for switching packets within said core network.

25. The switching control infrastructure of claim 24, wherein said IP-based backbone utilizes Real-time Transport Protocol (RTP) as a bearer path transport mechanism.

26. The switching control infrastructure of claim 1, wherein said packet-switching backbone network is an ATM-or IP-based backbone utilizing Multiprotocol Label Switching (MPLS) label switching for switching packets within said core network.

27. A method for managing a telecommunication session for a mobile terminal within a distributed, packet-switched core network of nodes, wherein said telecommunications session includes a bearer plane for establishing an end-to-end user data connection and a control signaling plane consisting of a media control subplane and a call control subplane, and wherein said core network includes a packet-switching backbone network providing packet-switching communication transport facilities within said core network, and a wireless access gateway (WAG) providing bearer-path connectivity between a radio access network (RAN) and said core network, and an anchor packet gateway (APG) providing bearer-path connectivity between said WAG at least one of said nodes within said core network, said method comprising the steps of:

terminating a RAN channel within said WAG, wherein said RAN channel provides bearer-path connectivity between said RAN and said WAG;

terminating a packet-switched channel within said WAG, wherein said packet-switched channel provides bearer-path connectivity between said WAG and said packet-switching backbone; and mapping said RAN channel to said packet-switched channel within said WAG, such that said mobile telecommunication session is controlled within said core network.

28. The method of claim 27, further comprising the steps of:

terminating a first packet-switched channel within said APG, wherein said first packet-switched channel provides bearer-path connectivity between said APG and said WAG; and terminating a second packet-switched channel within said APG, wherein said second packet-switched channel provides bearer-path connectivity between said APG and at least one of said nodes within said core network.

29. The method of claim 28, wherein said APG terminates bearer-path channels within said core network and a media content server providing conferencing and announcements, said method further comprising the step of utilizing said APG to hide the mobility of said mobile terminal within said bearer plane, between RAN domains served by different WAGS, from either said media content server or a media gateway involved in said telecommunications session.

30. The method of claim 29, wherein said telecommunications session includes a mobile handoff involving two WAGs which serve different RAN domains, said method further comprising the step of utilizing said APG to support mobility of said mobile terminal within said bearer plane, by providing multicasting to said two WAGs during said handoff.

31. The method of claim 28, wherein said core network further comprises a wireless mobility server (WMS) in communicative contact with said WAG, said method further comprising the steps of:

exchanging call and media control signaling messages between said RAN and said WMS; and controlling said bearer-path connectivity within said WAG in accordance with said exchanging step.

32. The method of claim 31, wherein said controlling step further comprises the steps of:

delivering a media gateway connection creation request from said WMS to said WAG; and establishing a media gateway control protocol context which associates said RAN channel termination with said packet-switched channel termination, such that said WAG supports data transfer and format conversion between a RAN channel and said packet-switched core network.

33. The method of claim 31, wherein said WMS is in communicative contact with said APG, said method further comprising the steps of:

exchanging media control signaling messages between said APG and said WMS; and controlling said bearer-path connectivity within said APG in accordance with said exchanging step.

34. The method of claim 33, wherein said controlling step further comprises the steps of:

delivering a media gateway connection creation request from said WMS to said APG; and establishing a media gateway control protocol context which associates said first packet-switched channel termination with said second packet-switched channel termination, such that said APG supports data transfer between said WAG and at least one of said nodes within said core network.

35. The method of claim 31, wherein said core network further comprises a call server (CS), and wherein call-control logic is divided between said WMS and said CS, such that said WMS contains all call-control logic related to terminal mobility and to wireless characteristic of said mobile terminal, and said CS contains all call-control logic related to call-control signaling to and from said CS, and wherein said method further comprises the step of utilizing said WMS to hide mobility and wireless characteristics of said mobile terminal from said CS on said call control subplane and said media control subplane.

36. The method of claim 35, wherein said WMS comprises a call-control interface to said CS, and wherein said method further comprises the step of utilizing said call-control interface to said CS to hide mobility and wireless characteristics of said mobile terminal, such that said CS may be other that MSC-derived.

37. The method of claim 36, further comprising the step of deriving said CS from a Class-5 switch which provides line services to users within a PSTN, such that said CS may offer said line services to said mobile terminal.

38. The method of claim 36, further comprising the step of utilizing call redirection over said call-control interface, to hide mobility of said mobile terminal during attempts to terminate a call to said mobile terminal.

39. The method of claim 35, further comprising the step of presenting said WMS as a media gateway to said CS within said media control subplane, while utilizing said WMS as a media gateway controller for said WAG and said APG, thereby hiding mobility of said mobile terminal from said CS on said media control subplane.

40. The program product of claim 39, wherein said WMS comprises a call-control interface to said CS, and wherein said program product further comprises instruction means for utilizing said call-control interface to said CS to hide mobility of said mobile terminal, such that said CS may be other that MSC-derived.

41. The program product of claim 40, wherein said CS is derived from a Class-5 switch which provides line services to users within a PSTN, said program product further comprising instruction means for offering said line services from said CS to said mobile terminal.

42. The program product of claim 40, further comprising instruction means for utilizing call redirection over said call-control interface, to hide mobility of said mobile terminal during attempts to terminate a call to said mobile terminal.

43. The method of claim 35, further comprising the steps of:
  utilizing inter-WMS signaling to achieve mobile termination where said mobile terminal has roamed into a domain of a WMS other than a WMS designated as a home WMS for said mobile terminal; and
  utilizing inter-WMS signaling to support handoff, during a data transfer phase of said telecommunications session, between WAGs that are controlled by different WMSs.

44. A program product comprising computer readable storage media including program logic that causes control circuitry to execute program instructions for managing a telecommunication session for a mobile terminal within a distributed, packet-switched core network of nodes, wherein said telecommunications session includes a bearer plane for establishing an end-to-end user data connection and a control signaling plane consisting of a media control subplane and a call control subplane, and wherein said core network includes a packet-switching backbone network providing packet-switching communication transport facilities within said core network, and a wireless access gateway (WAG) providing bearer-path connectivity between a radio access network (RAN) and said core network, and an anchor packet gateway (APG) providing bearer-path connectivity between said WAG and said core network, wherein said program product further comprises:
  instruction means for terminating a RAN channel within said WAG, wherein said RAN channel provides bearer-path connectivity between said RAN and said WAG;
  instruction means for terminating a packet-switched channel within said WAG, wherein said packet-switched channel provides bearer-path connectivity between said WAG and said packet-switching backbone; and
  instruction means for mapping said RAN channel to said packet-switched channel within said WAG, such that said mobile telecommunication session is controlled within said core network.

45. The program product of claim 41, further comprising:
  instruction means for terminating a first packet-switched channel within said APG, wherein said first packet-switched channel provides bearer-path connectivity between said APG and said WAG; and
  instruction means for terminating a second packet-switched channel within said APG, wherein said second packet-switched channel provides bearer-path connectivity between said APG and at least one of said nodes within said core network.

46. The program product of claim 42, wherein said APG terminates bearer-path channels within said core network and a media content server providing conferencing and announcements, said program product further comprising instruction means for utilizing said APG to hide the mobility of said mobile terminal within said bearer plane, between RAN domains served by different WAGs, from either said media content server or a media gateway involved in said telecommunications session.

47. The program product of claim 43, wherein said telecommunications session includes a mobile handoff involving two WAG$_S$ which serve different RAN domains, said program product further comprising instruction means for utilizing said APG to support mobility of said mobile terminal within said bearer plane, by providing multicasting to said two WAGs during said handoff.

48. The program product of claim 45, wherein said core network further comprises a wireless mobility server (WMS) in communicative contact with said WAG, said program product further comprising:
  instruction means for exchanging call and media control signaling messages between said RAN and said WMS; and
  instruction means for controlling said bearer-path connectivity within said WAG in accordance with said exchanging step.

49. The program product of claim 48, wherein said controlling step further comprises the steps of:
  instruction means for delivering a media gateway connection creation request from said WMS to said WAG; and
  instruction means for establishing a media gateway control protocol context which associates said RAN channel termination with said packet-switched channel termination, such that said WAG supports data transfer and format conversion between a RAN channel and said packet-switched core network.

50. The program product of claim 48, wherein said WMS is in communicative contact with said APG, said program product further comprising:
  instruction means for exchanging media control signaling messages between said APG and said WMS; and
  instruction means for controlling said bearer-path connectivity within said APG in accordance with said exchanging step.

51. The program product of claim 50, wherein said controlling step further comprises the steps of:
  instruction means for delivering a media gateway connection creation request from said WMS to said APG; and
  instruction means for establishing a media gateway control protocol context which associates said first packet-switched channel termination with said second packet-switched channel termination, such that said APG supports data transfer between said WAG and at least one node within said core network.

52. The program product of claim 48, wherein said core network further comprises a call server (CS), and wherein call-control logic is divided between said WMS and said CS, such that said WMS contains all call-control logic related to terminal mobility and wireless characteristic of said mobile terminal, and said CS contains all call-control logic related to call-control signaling to and from said CS, and wherein said program product further comprises instruction means for utilizing said WMS to hide mobility and wireless characteristics of said mobile terminal from said CS on said call control subplane and said media control subplane.

53. The program product of claim 49, further comprising instruction means for presenting said WMS as a media gateway to said CS within said media control subplane, while utilizing said WMS as a media gateway controller for said WAG and said APG, thereby hiding mobility of said mobile terminal from said CS on said media control subplane.

54. The program product of claim 49, further comprising:
instruction means for utilizing inter-WMS signaling to achieve mobile termination where said mobile terminal has roamed into a domain of a WMS other than a WMS designated as a home WMS for said mobile terminal; and instruction means for utilizing inter-WMS signaling to support handoff, during a data transfer phase of said telecommunications session, between WAGs that are controlled by different WMSs.

* * * * *

UNITED STATES PATENT AND TRADEMARK OFFICE
CERTIFICATE OF CORRECTION

PATENT NO. : 6,490,451 B1
DATED : December 3, 2002
INVENTOR(S) : Denman et al.

It is certified that error appears in the above-identified patent and that said Letters Patent is hereby corrected as shown below:

<u>Title page,</u>
Item [57], ABSTRACT,

An improved method and system for providing packet-switched management of switching and handoff functions for a mobile terminal during call setup and user communication phases of a telecommunication session. A radio access network (RAN) including an air-interface base station in communication with the mobile terminal is in communicative contact with a packet-switched core network comprised of a plurality nodes which provide functionality that is equivalent to that of a network of Mobile Switching Centers (MSCs) and Visitor Location Registers (VLRs). A packet-switching backbone network provides communication transport facilities within the core network. Within the core network is a wireless access gateway (WAG) having media channels that provide an interface between the RAN and the core network. An Anchor Packet Gateway (APG) extends the bearer path from the WAG, and hides mobility between WAGs during the user communication phase. A wireless mobility server (WMS) in communicative contact with the WAG and APG serves as a media gateway controller for the WAG and APG, controlling connectivity of the media channels with the WAG and APG. A PSTN Trunking Media Gateway (PTMG) provides connectivity between the core network and the PSTN. A Call Server (CS) in communicative contact with the PTMG and WMS serves as a media gateway controller for the PTMG and WMS, where the WMS presents the appearance of a media gateway to the CS, but in fact functions as a media gateway controller for the WAG and APG. The CS and WMS together present the appearance of a single MSC/VLR to the public cellular or PCS network.

should be replaced with,

-- A radio access network (RAN) in communication with a mobile is in communication with a packet-switched core network, which provide functionality equivalent to a network of Mobile Switching Centers (MSCs) and Visitor Location Registers (VLRs). A wireless access gateway (WAG) has media channels providing an interface between the RAN and core network. A wireless mobility server (WMS) in communicative with the WAG and an Anchor Packet Gateway (APG) serves as a media gateway controller for the WAG and APG. A PSTN Trunking Media Gateway (PTMG) provides connectivity between the core network and the PSTN. A Caller Server (CS) in communication with the PTMG and WMS serves as a media gateway controller for the PTMG and WMS, where the WMS appears as a media gateway to the CS. The CS and WMS together present the appearance of a single MSC/VLR to the public cellular of PCS network.--.

Signed and Sealed this

Nineteenth Day of August, 2003

JAMES E. ROGAN
*Director of the United States Patent and Trademark Office*